United States Patent [19]

Ryba et al.

[11] Patent Number: 5,574,936

[45] Date of Patent: Nov. 12, 1996

[54] ACCESS CONTROL MECHANISM CONTROLLING ACCESS TO AND LOGICAL PURGING OF ACCESS REGISTER TRANSLATION LOOKASIDE BUFFER (ALB) IN A COMPUTER SYSTEM

[75] Inventors: Edward G. Ryba, Milpitas; Peter H. Lipman; Jefferson J. Connell, both of Cupertino; David Weiss, Palo Alto, all of Calif.

[73] Assignee: Amdahl Corporation, Sunnyvale, Calif.

[21] Appl. No.: 378,082

[22] Filed: Jan. 25, 1995

Related U.S. Application Data

[63] Continuation of Ser. No. 257,457, Jun. 9, 1994, abandoned, which is a continuation of Ser. No. 816,864, Jan. 2, 1992, abandoned.

[51] Int. Cl.$^6$ .................................................. G06F 12/00
[52] U.S. Cl. ....................... 395/800; 395/406; 364/228.2; 364/DIG. 1
[58] Field of Search ..................... 395/800, 700, 395/775, 400, 425, 406; 364/228.2, DIG. 1

[56] References Cited

U.S. PATENT DOCUMENTS

| | | | |
|---|---|---|---|
| 4,430,707 | 2/1984 | Kim | 395/650 |
| 4,945,480 | 7/1990 | Clark et al. | 395/700 |
| 5,023,773 | 6/1991 | Baum et al. | 395/425 |
| 5,220,669 | 6/1993 | Baum et al. | 395/775 |
| 5,230,069 | 7/1993 | Brelsford et al. | 395/400 |
| 5,295,251 | 3/1994 | Wakui et al. | 395/400 |

*Primary Examiner*—Alyssa H. Bowler
*Assistant Examiner*—John Harrity
*Attorney, Agent, or Firm*—Fliesler, Dubb, Meyer & Lovejoy

[57] ABSTRACT

An access control apparatus in a computer system for controlling access to an ALB. A host ALBID register and a guest ALBID register is provided for storing a host and a guest ALB identifier (ALBID) and a host and a guest ALBID validity indicator. Control State Software generates and stores the host and guest ALBIDs in the host and guest ALBID registers and marks valid the host and guest ALBID validity indicator whenever a host or guest mode is initiated or a logical purge is requested by a logical processor and for storing the host or guest ALBID stored in the host and guest ALBID registers when an ALB entry is made in the ALB by a logical processor. Access to an ALB entry by a logical processor is permitted when the logical processor is in the host mode if the ALBID in the ALB entry matches the host ALBID stored and the valid indicator is marked valid in the host ALBID register and when the logical processor is in the guest mode if the ALBID in the ALB entry matches the guest ALBID stored and the valid indicator is marked valid in the guest ALBID register. A host logical purge is accomplished by marking invalid the host and guest validity indicators in the host and guest ALBID registers. A guest Logical purge is accomplished by marking invalid the guest validity indicator in the guest ALBID register.

13 Claims, 10 Drawing Sheets

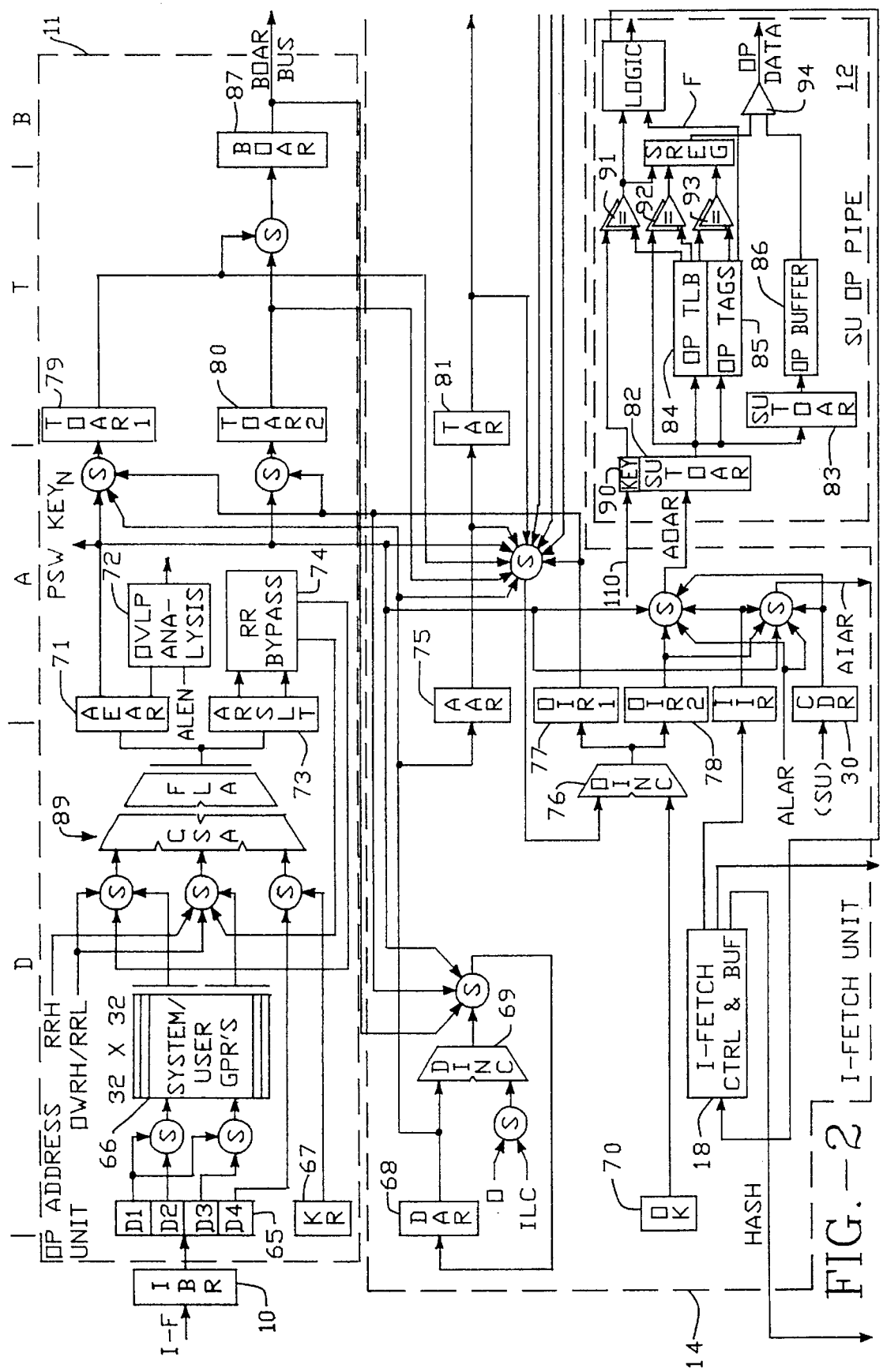

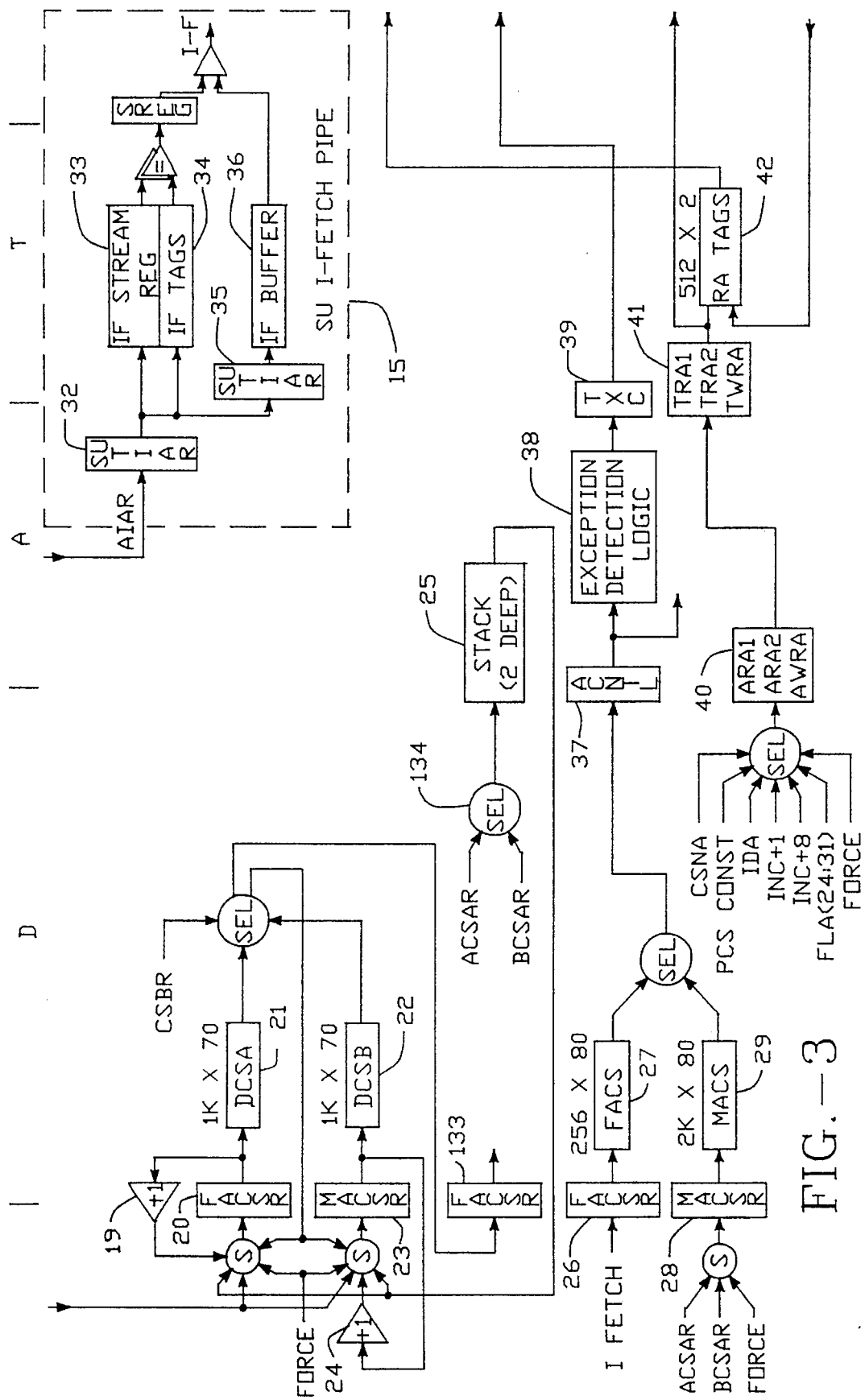
FIG.—3

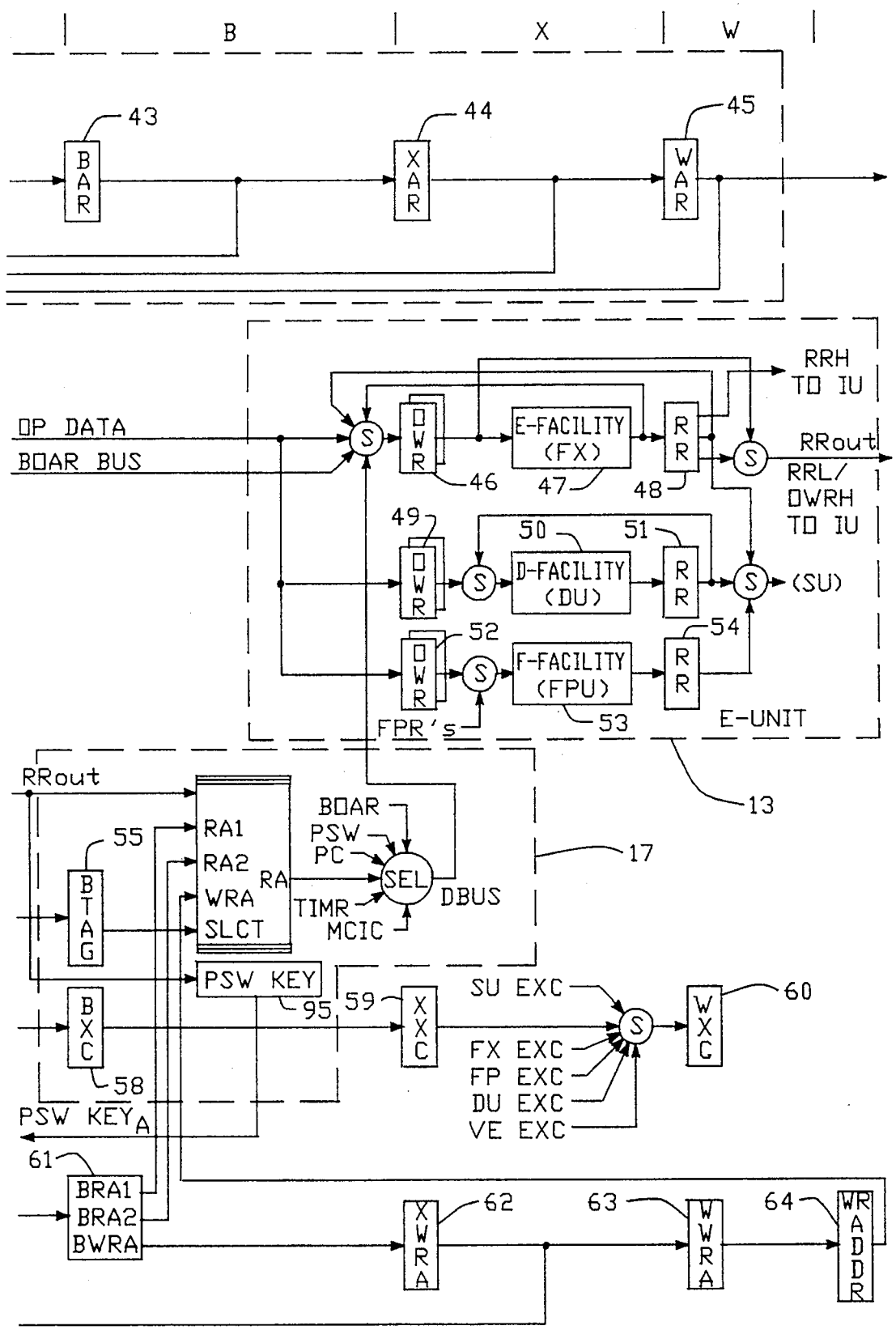
FIG.—4

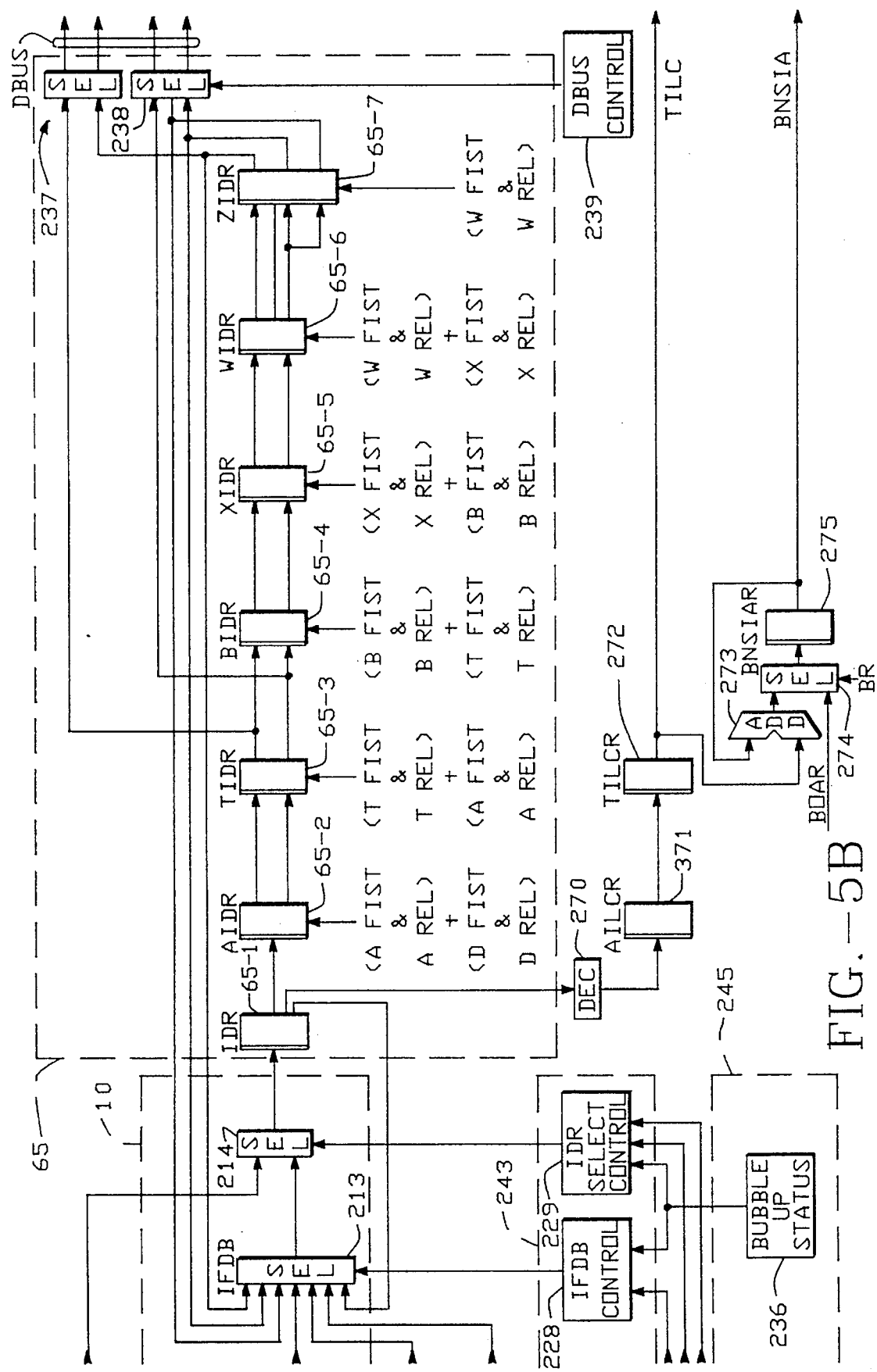

ACCESS CONTROL MECHANISM CONTROLLING ACCESS TO AND LOGICAL PURGING OF ACCESS REGISTER TRANSLATION LOOKASIDE BUFFER (ALB) IN A COMPUTER SYSTEM

This application is a continuation of Ser. No. 08/257,457, filed Jun. 9, 1994, now abandoned, which is a continuation of Ser. No. 07/816,864, filed Jan. 2, 1992, now abandoned.

BACKGROUND OF THE INVENTION

The present invention relates to the field of computers and particularly to computers having central processing units (CPU's) that operate in accordance with the IBM ESA/390 architecture and particularly to computers that have means for accessing and purging an Access Register Translation Lookaside Buffer (ALB).

ESA/390 architecture computers are controlled by a Program Status Word (PSW). The program-status word (PSW) includes the instruction address, condition code, and other information used to control instruction sequencing and to determine the state of the computer. The active or controlling PSW is called the current PSW. It governs the program currently being executed.

The CPU has an interruption capability, which permits the CPU to switch rapidly to another program in response to exception conditions and external stimuli. When an interruption occurs, the CPU places the current PSW in an assigned storage location, called the old-PSW location, for the particular class of interruption. The CPU fetches a new PSW from a second assigned storage location. This new PSW determines the next program to be executed. When it has finished processing the interruption, the interrupting program may reload the old PSW, making it again the current PSW, so that the interrupted program can continue.

The status of the CPU can be changed by loading a new PSW or part of a PSW. Control is switched during an interruption of the CPU by storing the current PSW, so as to preserve the status of the CPU, and then loading a new PSW.

A new or modified PSW becomes active (that is, the information introduced into the current PSW assumes control over the CPU) when the interruption or the execution of an instruction that changes the PSW is completed.

A storage key is associated with each 4K-byte block of storage that is available in the configuration. The storage key has the following format.

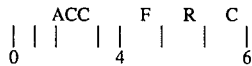

The bit positions in the storage key are allocated as follows:
Access-Control Bits (ACC)

If a reference is subject to key-controlled protection, the four access-control bits, bits 0-3, are matched with the four-bit access key when information is stored, or when information is fetched from a location that is protected against fetching.
Fetch-Protection Bit (F)

If a reference is subject to key-controlled protection, the fetched protection bit, bit 4, controls whether key-controlled protection applies to fetch-type references are monitored and that fetching with any access key is permitted; a one indicates that key-controlled protection applied to both fetching and storing. No distinction is made between the fetching of instructions and of operands.
Reference Bit (R)

The reference bit, bit 5 normally is set to one each time a location in the corresponding storage block is referred to either for storing or for fetching of information.
Change bit (C)

The change bit, bit 6, is set to one each time information is stored at a location in the corresponding storage block.
Protection Protection facilities are provided to protect the contents of main storage from destruction or misuse by programs that contain errors or are unauthorized. Key-controlled protection, access-list-controlled protection, page protection, and low-address protection are forms of protection available in ESA/390.
Key-Controlled Protection When key-controlled protection applies to a storage access, a store is permitted only when the storage key matches the access key associated with the request for storage access; a fetch is permitted when the keys match or when the fetch-protection bit of the storage key is zero.

The keys are said to match when the four access-control bits of the storage key are equal to the access key, or when the access key is zero.
Fetch-Protection-Override Control Bit 6 of control register 0 is the fetch-protection-override control. When the bit is one, fetch protection is ignored for locations at effective addresses 0–2047. An effective address is the address which exists before any transformation by dynamic address translation or prefixing. However, fetch protection is not ignored if the effective address is subject to dynamic address translation and the private-space control, bit 23, is one in the segment-table designation used in the translation.

Fetch protection override has no effect on accesses which are not subject to key-controlled protected.
Access-List-Controlled Protection In the access-register mode, bit 6 of the access-list entry, the fetch-only bit, controls which types of operand references are permitted to the address space specified by the access-list entry. When the entry is used in the access-register-translation part of a reference and bit 6 is zero, both fetch-type and store-type references are permitted, and an attempt to store causes a protection exception to be recognized and the execution of the instruction to be suppressed.
Page Protection The page-protection facility controls access to virtual storage by using the page-protection bit in each page-table entry. It provides protection against improper storing.

One of the instructions that is able to modify part of a PSW is the Set PSW Key From Address (SPKA) instruction. The ESA/390 architecture requires the SPKA instruction to load the architecturally defined PSW "access key" from four bits extracted from the effective address of the SPKA instruction. The access key is used to limit the access of future instructions to certain storage areas to aid in providing protection and privacy of information.

In the problem state, the execution of the SPKA instruction is subject to control by the PSW-key mask in control register 3. When the bit in the PSW-key mask corresponding to the PSW-key value is set is one, the SPKA instruction is executed successfully. When the selected bit in the PSW-key mask is zero, a privileged-operation exception is recognized. In the supervisor state, any value for the PSW key is valid. During execution of the SPKA instruction, the Condition Code remains unchanged.

The format of the SPKA instruction permits the program to set the PSW key either from the general register designated by the $B^2$ field or from the $D^2$ field in the instruction itself.

When one program requests another program to access a location designated by the requesting program, the SPKA instruction can be used by the called program to verify that the requesting program is authorized to make this access, provided the storage location of the called program is not protected against fetching. The called program can perform the verification by replacing the PSW key with the requesting-program PSW key before making the access and subsequently restoring the called-program PSW key to its original value. Caution must be exercised, however, in handling any resulting protection exceptions since such exceptions may cause the operation to be terminated.

One well-known computer operating with the IBM ESA/390 architecture is the Amdahl 5995-A computer. In that computer, the I-Unit pipeline is a six stage pipeline consisting of stages D, A, T, B, X, and W that process instructions.

One of the functions of the D stage is to collate the necessary information to reference storage in the A, T, and B stages. This D-stage function includes the generation of the effective address and selection of the access key to be used by the reference. The A, T, and B stages fetch operands/data using the current valid key that is defined by the architecture, PSW $KEY_A$.

One of the functions of the W (write) stage is to write results of operations to architecturally defined registers or storage. The W stage in the pipeline comes after the fetch-operands/data stages (A, T, and B) and the arithmetic functions stage (X). The access key used is the key, PSW $KEY_A$, from the architecturally defined PSW register. After the access key in the PSW has been updated in the W stage, the new key, $PSW_N$, is available for future operations/instructions and the new key becomes the architecturally defined key, PSW $KEY_A$. The ESA/390 architecture requires that the new key be effective starting from the instruction immediately following the SPKA instruction. The new PSW key can be used in a subsequent D segment while being updated in the W segment.

The fetching of any instruction following a SPKA instruction is subject to key fetch protection and hence must wait until the SPKA instruction has updated the key in the PSW register.

If a storage-reference instruction (an instruction that references storage) immediately follows a SPKA instruction, the fetching of data by that storage-reference instruction must wait until after the SPKA instruction has updated the access key in the PSW register, that is, must wait until the architecturally defined key, PSW $KEY_A$, has been updated with the new value, $PSW_N$, from the SPKA instruction.

In computer systems, a system control program (SCP) is responsible for resource management and often uses architectural registers. Computer systems under control of the control program operate in User State and in Control State. In User State, user programs and vendor-provided operating systems execute. IBM system control programs (CP's) run in User State. Certain instructions and facilities of User State may be emulated by Control State software.

Control State is for controlling system resources and they may be shared by multiple domains and provide emulation when necessary. Emulation may be used for enhancing the IBM ESA/390 architecture or may be used so that User State programs that run on one manufacturer's machines having one set of hardware may run on another manufacturer's machines with different hardware. Control State operation is based on the IBM ESA/390 architecture. Entry to Control State from User State is vectored, invoked by Control Interceptions that require assistance by Control State software.

Transitions from User State to Control State occur under a number of conditions. For example, a transition may occur when an instruction occurs that is defined as an emulated instruction when an instruction occurs for which a specific interception control is set, when an interruption occurs for which a specific interception control is set, when an interruption occurs that is defined as a mandatory Control Interception.

The SCP in some environments operates the machine hardware and multiplexes the physical resources of the computing system into multiple logical entities called virtual machines, each of which is a simulation of a computer dedicated to the servicing of a single user or (in the case of a server) a single application. Virtual machines are software entities that can be easily configured to running a particular program rather than to a user. A virtual machine configured in this manner is referred to as a virtual machine server. By virtualizing, operating systems can link guest systems together without the need for guest-specific actual hardware. Also, operating systems allow multiple guest systems to share devices and other resources to simplify configuration and maintenance.

Resource management (SCP) and user management (CMS) are separate. When a CMS user logs on to the system, the SCP (system control program) creates a virtual machine for that user that includes, among other things, storage address space. An address space is a sequence of addresses that starts at one address and extends up to a value that varies according to size. Storage management is an important task of the supervisor or host which must create, share, and otherwise manage address spaces, gain and relinquish access to an address spaces, and map data on external devices.

Virtual machines running in the ESA/390 architecture have at least one address space, the primary address space, given to the user by the SCP when the user logs on to the system. The size of this address space is determined from the entry describing that user in the user directory, or from a subsequent DEFINE STORAGE command. After logging on, if authorized in the user directory, a user may create other address spaces and share them with other logged-on users.

Before a program can actually read or write data in a nonprimary address space, it must invoke an SCP service to add an entry designating that address space to its access list. Each virtual configuration has its own access list having entries that determine which address spaces the virtual CPUs in that configuration can reference at any one time. The number of entries in the access list is controlled by information in the user's directory entry.

When a program adds an address space to its access list, SCP selects an unused entry in the access list, fills it in as requested by the program, and returns a four-byte access-list-entry token (ALET) to the program. A program uses this ALET to make direct references to the address space. The access-list entry thus allocated remains allocated until the program explicitly removes the entry, or until the virtual machine goes through a virtual- machine-reset operation.

Interpretive-Execution

The IBM Interpretive Execution Facility (IEF) allows a computer system running under a host System Control Program (SCP) to interpret a virtual machine called the guest. The term "host" refers to the real machine together with the SCP running on the real machine. The host manages real-machine resources and provide services to the guest programs which execute in an interpreted machine. The interpreted and host machines execute guest and host programs, respectively. For a transfer of control from a guest virtual machine back to its host System Control Program (SCP), an "interception" occurs.

In the existing computer architecture, when a guest issues a START INTERPRETIVE EXECUTION (SIE) instruction, the instruction is intercepted and emulated by the host program at a significant performance cost. Through emulation, the host provides the functions of a selected architecture which may be available on some other real machine or which may be available only in the virtual-machine environment. Privileged and problem-program instruction execution, address translation, interruption handling, timing and other functions are interpreted so that those functions are executed in the context of the virtual machine. With the addition of special-purpose hardware, interpreted execution can approach speeds that are comparable to native-mode execution, that is, execution by a non-interpretive version of the architecture.

In the virtual-machine environment, the guest program has access to all the functions defined for the designated architecture either through an interpretive-execution facility or by the host system control program. For VM/ESA, the control program CP provides functions through simulation. Simulation generally executes guest functions transparently so that the guest program is unaware as to whether a function is performed by the machine or the host except that simulation usually requires more time.

When an SIE instruction is executed, the operand of the SIE instruction containing the State Description is fetched to obtain information about the current state of the guest. When execution of SIE ends, information representing the state of the guest, including the guest program status word (PSW), is saved in the state description before control is returned to the host. The information in the state description, as used and modified by the host during simulation, allows the guest to start and stop execution with valid information. The state description also determines the mode and other environmental conditions in which the guest is to execute.

While in interpretive-execution mode the host, in order to be protected from interference by guests or interference among guests, allocates portions of the real-machine resources to the virtual machine. Guest storage is confined to a portion of host real storage or to host virtual address spaces controlled by the host system. Host enabled and disabled states generally are undisturbed by execution of the guest. A complete and logically separate set of control registers is maintained by the machine for use by the host and another set for each guest is maintained for use by the guest. Other registers are shared between the host and guests.

In some cases, the host intercepts operations normally performed by the machine. The state description includes control bits settable by the host to cause intercept operations under specific conditions. When the specific condition are met, the machine returns control to host simulation. Intervention controls capture the introduction of an enabled state into the PSW, so that the host can present an interruption which it holds pending for the guest. Intervention controls may be set asynchronously by the host on another real processor while interpretation proceeds. The machine periodically refetches the controls from storage, so that updated values will be recognized. Guest interruptions can thereby be made pending without prematurely disturbing interpretation.

Guest Storage

Preferred-storage mode and pageable-storage mode are provided for in the interpretive-execution architecture. In preferred-storage mode, a contiguous block of host absolute storage is assigned to the guest and in pageable-storage mode, dynamic address translation (DAT) at the host level is used to map guest main storage. In preferred-storage mode, the lower addresses of the machine storage are dedicated to the guest and only one guest can obtain production mode performance.

In the pageable-storage mode, the host has the ability to scatter the real storage of pageable-storage-mode guests to usable frames anywhere in host real storage by using the host DAT, and to page guest data out to auxiliary storage. This method provides flexibility when allocating real-machine resources while preserving the expected appearance of a contiguous range of absolute storage for the guest.

A virtual-machine environment may require DAT twice, once at guest level, to translate a guest virtual address into a guest real address, and then, for a pageable guest, at the host level, to translate the corresponding host virtual address to a host real address.

Multiple High-performance Guests

The Multiple Domain Facility™ (MDF™) available on Amdahl computers provided concurrent execution of two or more operating systems with high performance on a single shared central computing complex. Such operation permits the reassignment of resources dynamically with minimal performance penalty for a variety of different architectures or systems.

Access Registers

The IBM ESA/390 architecture defines access registers that allow a problem-state program to refer to data in multiple address spaces concurrently, without supervisor intervention. The access registers provide a method to move data between two address spaces. They also allow the use of the complete instruction set to operate on data in multiple address spaces.

In the computer system, the base (B) field or register (R) field of an instruction designates a general register. In the access-register mode, the same-numbered access register is used during access-register translation (ART) to determine the address space of the operand.

Access-register translation uses an access-list-entry token (ALET) in an access register to derive the segmenttable designation (STD) to be used during dynamic address translation (DAT). The STD corresponds to an address space.

Access registers are also available to a guest in ESA/390 mode. The host is responsible for loading the guest's access-register values before starting interpretive execution, and for saving them (and restoring host values) afterward. The guest operating system must build the guest virtual address spaces and associated control structures, just as it would natively. Pages in these address spaces may be mapped to areas of guest main storage or paged by the guest supervisor to auxiliary storage.

In the ESA/390 Principles of Operation, the Access Register Translation (ART) process normally involves a two-level table lookup operation to access a Segment Table Designator (STD) to be used for virtual address translation, thereby specifying a virtual address space. The STD is then used in another two-level table lookup operation to translate the virtual address to a real address, as part of the Dynamic Address Translation process, or DAT.

This two-level lookup for DAT normally must be performed at every virtual access of storage, and therefore is very costly in terms of overall processor performance. The IBM architecture describes a Translation Lookaside Buffer (TLB) mechanism which keeps track of the most recently used virtual-to-real address translations and makes the results available for use by the processor logic at storage access time, avoiding the need to spend processor cycles on the DAT process.

The ALB is similar in both structure and concept to the TLB and is intended to provide the same performance enhancement to the ART process that the TLB provides for the DAT process.

A single ALB is physically implemented in each processor. However, multiple Logical Processors (LPs) can run on a given processor and therefore, whenever a switch is made on the physical processor between LP's currently running on the processor, the physical ALB normally requires a logical purge of all entries created up to the point of the context switch in order to insure that the entries in the ALB are logically consistent with the environment of the currently running LP. Because the physical processor is time-shared by many LPs, if this physical purge of the ALB is performed at each context switch, the performance gain provided by the ALB is eliminated since no logical entries created by a given LP would survive a context switch to another LP. If the original LP was redispatched, there would be no valid entries in the ALB, and ART would have to be reinvoked to create them, only to be lost again at the next context switch.

Host Access-Register Translation

When an access register contains a value other than zero and the guest is in access-register mode, the operand address specified refers to data in a host AR-specified address space. The contents of the base register together with the displacement and the index register, if applicable, are used to determine the offset of the data within the address space.

To resolve the address space of the operand, host access-register translation (host ART) is applied. Host access-register translation is similar to the access-register-translation process used in ESA/390 mode. Host ART uses an access-list-entry token in an access register to obtain the segment-table designation (STD) to be used during host dynamic address translation. 2 shows a flow chart of the host ART process.

During host ART, the designated access register contains an access-list-entry token. This token, which is obtained using VM/ESA services, has an access-list-entry number.

The origin of the primary address-space number (ASN) second-table entry (primary ASTE) is obtained from a host control register. An ASTE is associated with each address space and has the same format in VM Data Spaces as in ESA/390. The primary ASTE contains the origin of the access list used during the host access-register translation (host ART). An ASTE is also used later in the host ART process.

An access list contains entries which represent the addressing capabilities of the guest. The access-list-entry number in the access register together with the access-list origin in the primary ASTE determine the access-list entry to be used during host ART.

An access-list entry contains the address of an ASN second-table entry (ASTE). When an ASTE is located by an access-list entry, it is referred to as an access-list-specified ASTE, to distinguish this use of the ASTE from the primary ASTE described earlier. The access-list-specified ASTE contains the STD to be used during host DAT.

It is desirable to provide a mechanism to preserve as many entries created by an LP in the ALB as possible across context switches. If entries can be uniquely associated with the LP that created them, then no purging is necessary at context switch time and entries created by a given LP can be preserved across the context switch. When a PALB instruction is issued by the LP, only the entries associated with that LP need to be physically purged in order to give the ALB the appearance of being logically purged as seen by the LP.

Although such a mechanism preserves ALB integrity for various LP's across context switches, it necessitates the implementation of a hardware search machine which can sequentially examine each entry in the ALB, determine if it is associated with the currently-running LP, and if so, invalidate it in order to provide a PALB mechanism as seen by the LP. Such a hardware search machine is expensive, and as the size of the ALB increases, the number of processor cycles required to search it grows, thereby decreasing overall performance of the PALB algorithm.

In light of the above background, there is a need for an improved mechanism in order to preserve the logical integrity of the ALB across context switches.

SUMMARY OF THE INVENTION

The present invention is a computer system that includes logical processors (LP's), access registers, an access-register translator (ART), an ART-lookaside buffer (ALB) having entries created by the logical processors, and operates to switch between LP's with a context switch.

An ALB identifier, ALBID is provided to uniquely associate an ALB entry with the LP that created the ALB entry in order to preserve the logical integrity of the ALB across context switches. An ALBID mechanism is provided to manage the assignment of values to ALBID's avoiding the need for employing a hardware search to find ALBID entries.

The ALBID is an n-bit quantity that is uniquely associated with a domain number, a physical CPU address, and a State Descriptor Address. The ALBID will uniquely identify a Logical Processor running in a specific Domain on a given physical processor. The number of bits (n) used to implement the ALBID is model-specific.

The ALBID architecturally differentiates Guest and Host mode to facilitate context switching between Guest and Host mode. The Domain Native (Host) ALBID is effective for LP's running in native mode or Host mode, and the Guest ALBID is effective for an LP running in Guest mode. Hardware registers are implemented in the Register Array to contain the Domain Native and Guest ALBID's, along with validity bits, concurrently. The operative ALBID is selected by the current mode of the LP.

An n-bit field in each of the physical ALB entries is used to contain the value of the effective ALBID of the LP which created the ALBID entry. This field is matched against the currently selected ALBID in the Register Array to determine if the selected entry was created by the currently-running LP. An entry is only considered valid for use in the ART process if the ALBID field matches the current Domain Native or Guest ALBID in the Register Array, as selected by the current mode of the LP. An n-bit ALBID field and validity bit is stored in the Logical Processor Control Field (LPCF) associated with each LP.

A checking mechanism tests the validity bit associated with the selected ALBID in the Register Array (depending on the current mode of the LP) and causes a Control Intercept to Control State Software (CSSW) if invalid.

A CSSW algorithm is employed for assigning unique ALBID's to LP's as they are dispatched and for maintaining and updating a list of dispatched ALBID's.

A Physical Purge ALB (PPALB) instruction physically invalidates all entries in the ALB, regardless of ALBID value, when executed.

The foregoing and other objects, features and advantages of the invention will be apparent from the following detailed description in conjunction with the drawings.

DESCRIPTION OF THE DRAWINGS

FIGS. 2, 3 and 4 depict detailed block diagrams of the FIG. 1 system.

FIGS. 5A and 5 depict a block diagram of the I-Fetch data and control circuitry that forms part of the FIG. 1 system.

DESCRIPTION OF THE PREFERRED EMBODIMENTS

Figure 1:
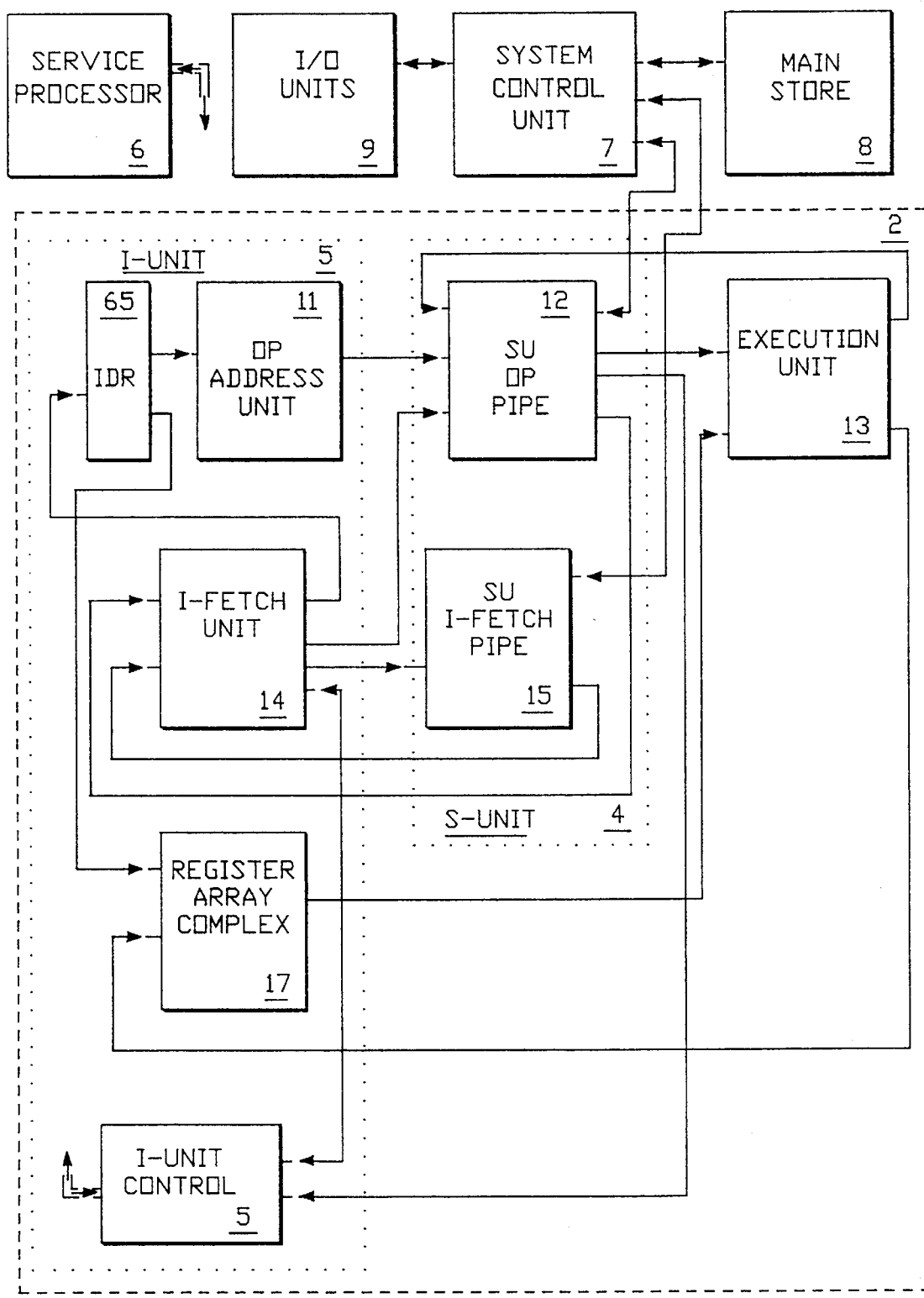
FIG. 1 depicts an overall block diagram of a computer system incorporating the present invention.

Overall Computer System—FIG. 1

In FIG. 1, a computer system compatible with the Amdahl 5995-A computer operating in accordance with the ESA/390 architecture is shown. The computer system of FIG. 1 includes an instruction unit (I-unit) 5, a storage unit (S-Unit) 4, an execution unit (E-Unit) 13, system control units 7, I/O units 9, main store 8, and a service processor 6. The instruction unit 5 includes an operand address unit 11, an instruction data register 10, an I-fetch unit 14, a register array 17, and an I-unit control 3. The storage unit 4 includes an SU Op Pipe 12 and an SU I-Fetch Pipe 15.

The FIG. 1 system features two machine states, User State and Control State. In User State, supersets of the IBM ESA/390 architecture are supported. Some User State operations may be emulated by Control State software. The architecture provides support for Control State Software to implement the "Multiple Domain Facility" (MDF). MDF provides for multiple computing systems to exist in User State on one processor complex. This operation is accomplished by providing each virtual computing system (domain) with its own private main storage, channels, operator console, and optionally expanded storage, while multiplexing all domains on the CPU resources available to the processor complex.

A "Domain" is a set of resources such as CPU's, main storage and channels available to a User State control program(CP). A domain program is a User State program. A domain consists of both domain-native and guest resources. The terms "User", "User State", and "LP (Logical Processor)" also refer to both domain-native and guest resources, although LP usually is used to refer to a domain CPU.

A "Guest" is a resource that requires the presence of a supporting 'host' domain control program. A guest program is one that runs in an environment consisting of a specific set of guest resources. When a CPU operates in guest mode (User State or Control State), domain resources accessed by a program are guest resources (for example, guest PSW) by default. In Control State, access to other resources is under program control which is sometimes called interpretive-execution mode. Domain Mode Control <A> indicates whether a CPU operates in guest mode or not.

"Domain-native" is a resource that does not require the presence of a domain control program. A domain-native program is one that runs in an environment consisting of domain-native resources. A CPU is in domain-native mode if it is not in guest mode; in this mode, domain resources accessed by a program are domain-native resources (for example, domain-native PSW) by default. In Control State, access to other resources is under program control.

A "Host" is a domain program that supports guest resources. The term "host" is meaningful when discussed in the context of a guest. Host resources may behave differently when the CPU is in guest mode. The term "host mode" may sometimes be used interchangeably with "domain-native" mode.

User programs and vendor-provided operating systems run in User State. IBM SCPs run in User State. User State may be in either System/370 or ESA/390 mode. Certain instructions and facilities of User State may be emulated by Control State software.

Control State is for controlling system resources and they may be shared by multiple domains and may provide emulation. Emulation is often used for enhancing the IBM ESA/390 architecture or for enabling User State programs that run on one manufacturer's machines to run on another manufacturer's machines. Control State operation is based on the IBM ESA/390 architecture. Entry to Control State from User State is vectored, invoked by Control Interceptions that require assistance by Control State software.

Transitions between User State and Control State occur under a number of conditions. For example, transitions occur when an instruction occurs that is defined as an emulated instruction, when an instruction occurs for which a specific interception control is set, when an interruption occurs for which a specific interception control is set, and when an interruption occurs that is defined as a mandatory Control Interception.

In the FIG. 1 system, there are two types of units of operation, the domain unit of operation (DUO) and the machine unit of operation (MUO).

In the FIG. 1 system, the System Communication Interface (SYSCOM) provides a means of communication among Control State software and various processing units within a system. These processing units include I/O Processors (IOPs), service processors (SVPs), and CPUs. The means of communication is through passing data in control blocks in the HSA, and informing the recipient via a signaling mechanism.

In FIG. 1, the service processor (SVP) 6 is provided to assist in configuration of the system, machine check handling, operator facilities, and other model-dependent functions.

The FIG. 1 system includes a facility to permit asynchronous communication between TCMPs using messages. The message processing facility and the instructions to support them are collectively known as the TCMP unification facility (TUF). TUF is distinguished from a local area network. The TUF assembles large single system images by linking TCMPs. The resulting complexes are used for transaction processing in large enterprises.

In the FIG. 1 system, the architectural register sets are defined as follows: access registers (AR), floating point registers (FR), general registers (GR), Control State and domain AR MAP registers (MR), register array (RA), and vector registers (VR). Other individual registers, such as the program status word (PSW), are also defined.

Using the GR as an example, the following notation is used to identify subsets of a register set. To specify register x of the set of GRs, the notation GRx is used if x is a number; the notation GR(x) is used if x is a variable (for example, GR(R1) means the general register designated by the R1 operand).

To specify the consecutive bit positions beginning with w and ending with z, the notation <w:z> is used. A string of bits is specified by listing the bits, separated by commas as in <x, w:z, ... >. To specify bit string y of register x of the set of GRs, the notation GRx<y> or GR(x)<y> is used. Bit string y may consist of only 1 bit. To specify bit string y within field F of register x of the set of GRs, the notation GRx.F<y> or GR(x).F<y> is used. Bit string y may consist of only 1 bit. Bit positions given for y are with respect to the field F (for example, DAC.DABR_ctl<0>\&).

In the FIG. 1 system, the various ones of the architectural registers are implemented in a register array. The registers in the register array are set forth in the following TABLE 1.

TABLE 1

CPU Register Array

| RA NOs. | |
|---|---|
| 0X | Control State General Registers |
| 1X | Control State Parameters |
| 2X | DAC/CI Parameters/Control State VBPA |
| 3X | Control State AR MAP Registers |
| 4X | Domain-Native General Registers |
| 5X | Domain Counters/Domain Parameters |
| 6X | Domain Parameters/Domain VBPA |
| 7X | Domain AR MAP Registers |
| 8X | Domain-Native Control Registers |
| 9X | Domain Parameters |
| AX | Access Registers |
| BX | Access Registers |
| CX | Guest Control Registers |
| DX | Guest Parameters |
| EX | Guest Parameters |
| FX | Reserved for Control State Software |

In FIG. 1, the main Store 8 contains a system storage area where Control State software and the Hardware System Area (HSA) reside, and domain storage area(s), one for each domain. Each storage area is a separate address space, or address dimension, that is, for example, up to 2 GB in size. Mapping of these address spaces to physical main storage is via blocks of storage that are 2 MB or larger.

Expanded Storage

Control State software and domains may each optionally have its own expanded storage. Mapping of Control State or domain expanded storage areas to physical expanded storage is similar to main storage mapping.

Shared Global Storage

The architecture can support a large single system image that is composed of multiple tightly coupled (i.e., shared main memory) multiprocessors (TCMP). Shared global storage (SGS) permits data to be shared between TCMPs by functionally connecting the SGS to the main storage of each of the TCMPs. A domain in a TCMP can share all or a portion of SGS with a domain in another TCMP. Mapping of domain SGS to physical SGS is similar to the expanded storage and main storage mapping.

In the FIG. 1 system, the register array (RA) Complex 17 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or CI. The RA contains most architecturally-defined registers and controls, including Control State prefix, domain-native prefix, guest prefix, DAC, feature control bits, general and control registers.

The architectural registers that are not in the same physical register array are listed as follows:

The Control State PSW is not in the RA. The host PSW to be saved in the interpretive-execution mode is also not maintained in the RA; it is saved in the LPSD. (Note that although the domain-native and guest PSWs are provided in the RA for CSSW to inspect and modify, the instruction-address field (bits 33:63) is invalid).

The host GRs 14 and 15 defined to be saved in the interpretive-execution mode are not maintained in the RA; they are saved in the LPSD. (Note that the User State and Control State GRs are in the RA).

There is one set of FRs provided in User State, and they are not contained in the register array.

In FIG. 1, main storage 8 contains (1) a system storage area (SSA) where Control State Software (CSS) [both instructions and data] resides and where the Hardware System Area (HSA) resides, and (2) domain storage areas (DSA), one for each domain. Mapping of these address spaces to physical main storage is via blocks of storage that are, for example, 2 MB or larger. A domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, CSSW can select either User PSW<AS> and PSW<T> to determine the mode of accessing main storage, or it may choose to use another set of three bits to determine the mode of accessing main storage, which can be different from the current one, as specified by the user PSW.

Detailed System—FIGS. 2, 3, 4

In FIGS. 2, 3 and 4, further details of the computer system of FIG. 1 are shown with an orientation as depicted in the lower right-hand corner of FIG. 1. The computer system operates in a pipelining fashion where operation is divided into a number of segments including P, A, T, B, R segments and D, A, T, B, X, and W segments. The units of FIGS. 2, 3, and 4 operate generally over the D, A, T, B, X, and W segments after a current instruction is loaded into the IDR register 65. To load an instruction, the P segment performs priority resolution, the A segment performs instruction address presentation, the T segment performs TLB lookup and cache tag matching, and the B segment loads the current instruction into the IDR register 65.

In FIG. 2, the I-Unit 5 fetches instructions into the instruction data register (IDR) 65 which are to be processed in a pipeline fashion. Up to six instructions, for example instruction $I_1$, $I_2$, $I_3$, $I_4$, $I_5$, and $I_6$ can be processing in the FIGS. 2, 3, and 4 units in the D, A, T, B, X, and W segments.

In FIG. 2, the I-fetch unit 14 fetches instructions and stores them into the IDR 65 and delivers them to the storage unit Op Pipe 12 and the storage unit I-fetch pipe 15 to maintain a flow of instructions to be executed. The units of FIG. 2 cooperate with the register array 17 for controlling the flow of instructions and operands in the pipeline execution of the computer system.

The I-fetch unit 14 pre-fetches each instruction into the instruction data register IDR 65 so that when the D segment commences, the I-fetch unit 14 has finished for the current instruction, for example instruction $I_1$, and is pre-fetching subsequent instructions for example instructions $I_2, I_3, I_4, I_5, I_6$ and $I_7$. The I-fetch unit 14 during prefetching interacts with the storage unit 4 during the P, A, T, B, R segments that all precede the D, A, T, B, X, and W segments.

In FIG. 2, the IDR 65 provides information to the operand address unit 11. The operand address unit 11 determines addresses information to be processed by instructions. The addresses of operands are passed to the storage unit of operand pipe 12 which fetches the operands which are to be operated upon and delivers them to the execution unit 13. The execution unit 13 performs arithmetic and logical functions on the operands such as add, multiply, divide, move, or, and shift.

After prefetching, the D segment is the decode cycle for instruction decoding of the instruction in IDR register 65.

The A segment is address presentation for the S-unit 4. The T segment is a translation TLB lookup and cache tag match cycle. The TLB is a translation look-aside buffer. The B segment is the buffer cycle when, if a correct translation occurred in the TLB and if the line of data addressed is in the cache, the data is accessed and latched into the operand word register OWR (46, 49, 52). The X segment is for execution in the E-Unit 13 which takes data from the OWR, executes on the data and places the result in the result register (48, 51, 54). The W segment is for writing the results to the location specified by the instruction, for example, to an internal register in register array 17 or back to main storage 8.

Referring to FIGS. 2, 3, and 4 the instruction buffer register 65 is loaded by the I-fetch unit 14. The instruction buffer register 10 in turn loads the IDR register 65 in four fields, D1, D2, D3 and D4. The contents of the register 65 are selected to read the system or user general purpose registers 66 (GPR's). The contents of the general purpose registers are selected into the three-input adder 89.

After the SPKA instruction is latched into the IDR 65, the data address in the DAR register 68, valid in the D segment, is staged through the address registers in the A, T, B, X and W segments using the registers DAR 68, AAR 75, TAR 81, BAR 43, XAR 44, and WAR 45, respectively. In one alternate embodiment, the registers AAR 75, TAR 81, BAR 43 are eliminated and the equivalent information is obtained from other registers. Conceptually, however, these registers still exist even in the alternate embodiment.

Following the ESA/390 architecture, an operand storage address consists of three components, a base, an index and a displacement. The base, index and displacement values from GPR's 66 are added in adder 89 to form the effective address which is latched into the ARSLT and/or AEAR registers 73 and 71.

The adder 89 forms the effective address and it is placed into the AEAR effective address register 71 and into the ARSLT result register 73. The contents of the effective address register 71 are present in the A segment and are used, among other things, as part of the access to the storage unit Op pipe 12 to obtain an operand from the storage unit. The contents are also stored into the T operand address registers 1 and 2, TOAR1 79 and TOAR2 80 in the T segment. The contents of one of the registers 79 or 80 are passed to the B segment operand address registers, BOAR 87. The storage unit Op pipe 12 includes a register 90 which is loaded with the PSW Key which is to be used for key protection checking when the storage unit is accessed. The key from the register 90 is compared in comparator 91 with a key from the OP TLB unit 84 to determine if a key match exits. The other portions of the TLB including the OP tags 85 and OP buffer 86 are also compared in comparator 92 to generate a TLB MATCH signal. If the key match from comparator 91 is not asserted, meaning that the key from register 91 does not match the key from the TLB unit, then the TLB match signal is not asserted meaning that a protection key violation has occurred. If the keys do match and all the other required matches are also present, the TLB match signal is asserted indicating that, among other things, no key protection violation has occurred.

If the instruction being processed is a SPKA instruction, for example, then the processing during the X segment will cause a new PSW including a new PSW Key$_N$ to be stored through the RR result registers 48, 51 and 54 to the register array complex 17. The PSW will be loaded directly into the register array 56 and also will be stored into the PSW Key shadow register 95. The PSW register 95 holds a duplicate copy of PSW Key stored in the register array 56.

Once the D-cycle of a SPKA instruction is complete, the effective address latched in the AEAR register 71 will be moved down the pipeline to provide a new PSW$_N$ in the W segment provided nothing prevents the new PSW$_N$ from being written.

Figure 5A:
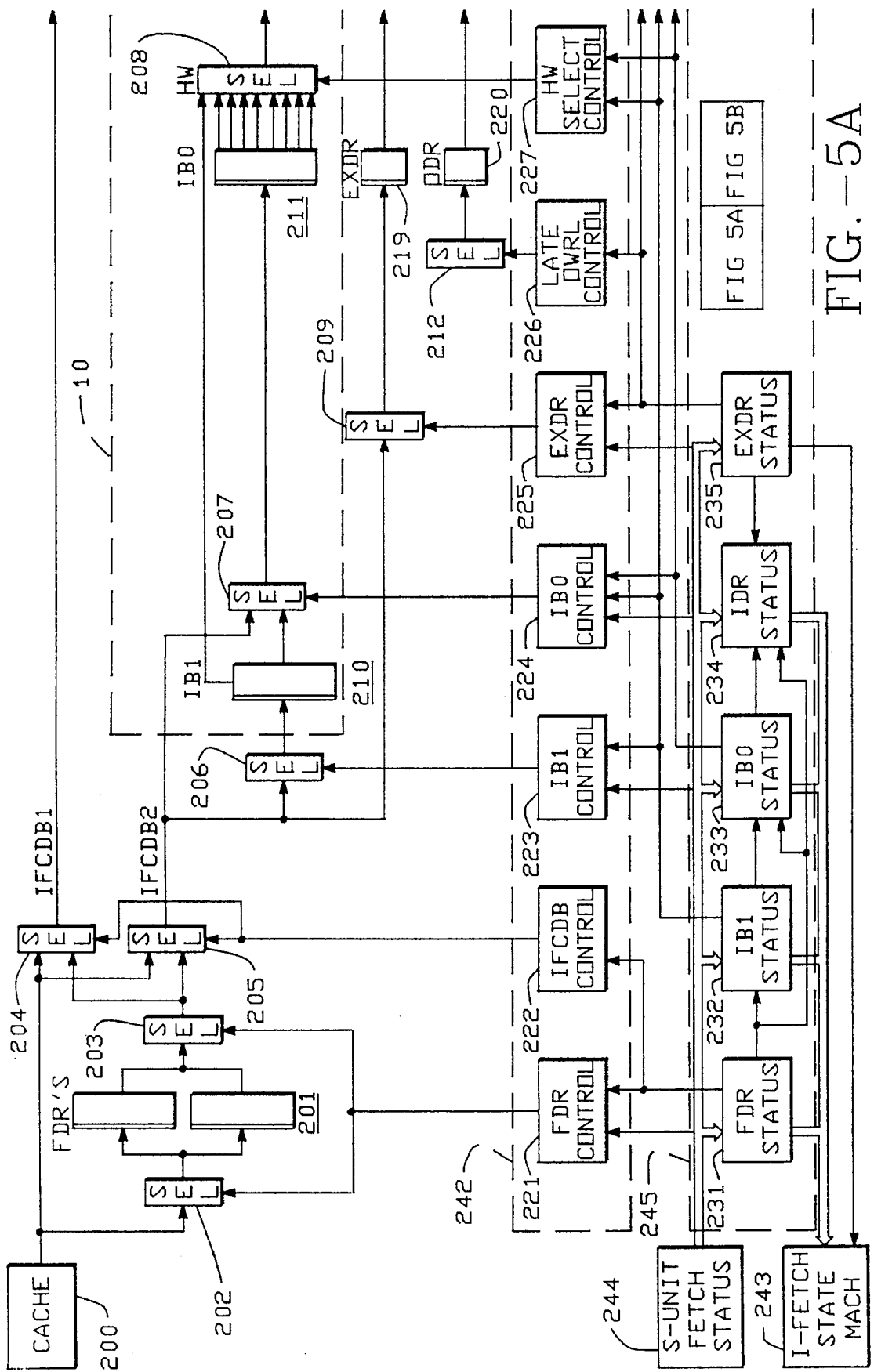

Instruction Fetch Platform—FIGS. 5A and 5B

In FIGS. 5A and 5B, further details of the I-Fetch Unit 14 of FIG. 1 are shown. In FIGS. 5A and 5B, the IDR Register 65 of FIG. 2 is expanded and is shown together with the circuitry for loading the IDR 65 with a sequence of instructions such as shown in TABLE A above.

In FIGS. 5A and 5B, the IDR 65 is loaded from the storage unit cache 200 or the FDR's 201. Selection of instructions into the FDR's 201 is under control of the selector 202 which in turn is controlled by the FDR control 221. Selection of instructions from the cache 200 or the FDR's 201 is under control of the selection gates 204 and 205 which in turn are controlled by the IFCDB control 222. Selection of instructions from the FDR's 201 is under control of the selection gate 203 which in turn is controlled by the FDR control 221. Selection gate 206 controls selection of the selected output of selector 205 into the IB1 buffer register 210. Selector 206 is under the control of the IB1 control 223. The selection from the buffer register IB1 or from the selector 205 is under control of the selector 207 which in turn is controlled by the IB0 control 224. The selected instruction selected by selector 207 is latched in the buffer register IB0 211. Selection of the contents of the IB0 register 211 by selector 208 is under control of the HW select control 227 and selector 208 in turn feeds the selector 213 which is under control of the IFDB control 228. The output from selector 213 or from the cache through selector 204 is under control of selector 214 which in turn is controlled by the IDR select control 229. The selected instruction from selector 214 is input to the IDR 5 which is staged through the IDR 65 stages IDR, AIDR, TIDR, BIDR, XIDR, WIDR, and ZIDR labeled 65-1, 65-2, 65-3, 65-4, 65-5, 65-6 and 65-7, respectively. The output form the ZIDR stage of the IDR 65 is selected by the selectors 37 and 238 is the DBUS of the Op Address Unit of FIG. 2.

In FIGS. 5A and 5B, a decoder 270 decodes the instruction length count, ILC, from the instruction in the D-segment instruction data register (IDR). The ILC is latched into the AILC register 271 and staged to the TILCR register 272 for the T-segment. The T-segment ILC, TILC, is added in adder 273 to the contents of the BNSIAR register 275 to form the next sequential instruction address (NSIA) which is stored back into the BNSIAR register 275. When a branch or other condition (BR) indicates that the next instruction in the sequence determined by adding the ILC to the current instruction is not the next instruction, the BNSIAR is loaded directly from the BOAR 87 of FIG. 2 under control of selector 274. The B-segment next sequential instruction address, BNSIA, is determined one instruction flow ahead of the current instruction in the pipeline. The BNSIA in the BNSIAR is a predicted value based on instruction length count.

In FIGS. 5A and 5B, control of the selection of which i instructions to feed into the IDR register 65 is under the selection controls 221 through 229 in control unit 242. These controls receive status information from status unit 245 which is loaded by the S-unit Fetch Status 244. Status unit 245 also provides status to the IFETCH state machine 243. The S-unit Fetch Status 244 loads the FDR status 231, IB1 status 232, IB0 status 233, IDR status 234, EXDR status 235 and the BUBBLE UP STATUS 236 in the status unit 245. The different status and control conditions and related circuits for a main frame computer are extensive, and many of the details related thereto are not relevant to the present invention, but such details can be found, for example, in the Amdahl 5995-A computers. The particular control and status conditions which are relevant for selecting instructions in connection with the present invention will be described in detail hereinafter.

Register Array Complex—FIG, 6

Figure 6:
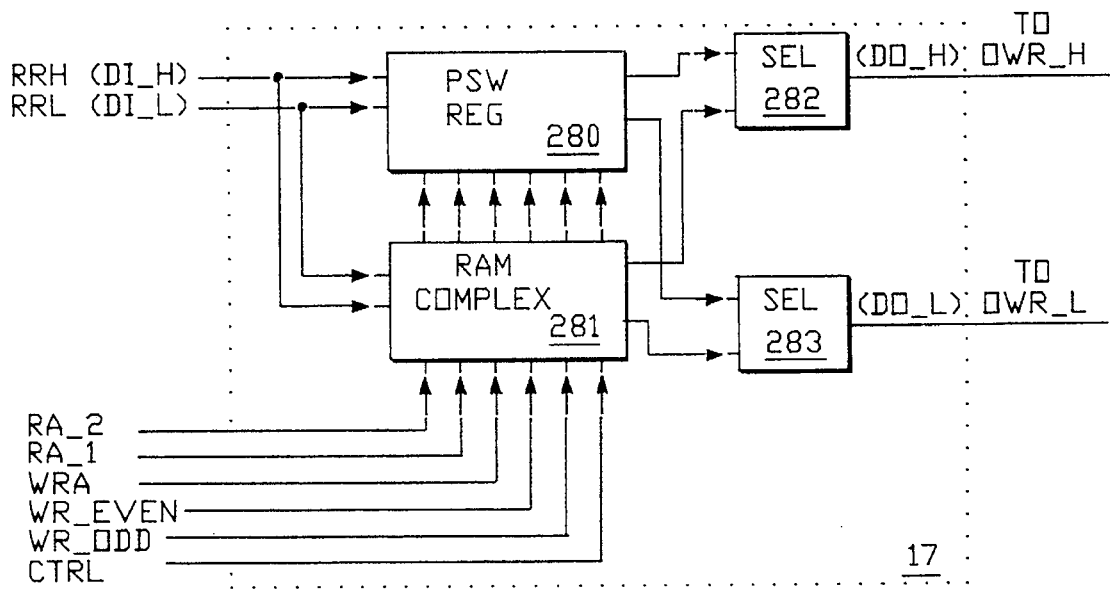
FIG. 6 depicts a detailed block diagram of the register array complex.

In FIG. 6, further details of the register array complex 17 of FIG. 1 are shown. In FIG. 6, the ram complex 281 is like that shown in the above-identified cross-referenced application entitled MEMORY HAVING CONCURRENT READ AND WRITING FROM DIFFERENT ADDRESSES. The PSW register uses the same data in lines DI_H and DI_L which are the RRH and RRL lines, RRout, from the result register. Similarly, the read address lines RA_1 and RA_2, the write address lines WRA, the even and odd write strobes WR_EVE and WR_ODD, and the control lines CTRL are as shown in the cross-referenced application. The selectors 282 and 283 are like the selectors 24 and 25 in FIG. 3 of the cross-referenced application with the addition of the PSW inputs.

The RAM complex 17 can concurrently read and write to different addresses. As described in detail in the cross-referenced application, the RAM complex includes two RAMs, each having an address selector. The RAM complex includes a data out multiplexer for selecting outputs from one of the RAM's. The RAM complex includes a tag array storing an array of tag bits, one for each address in the RAM's. The tag bits are used to control the address selectors and multiplexer.

A single bit tag is provided in the tag array for each entry in the RAM's. The tag marks which one of the two RAM's has the valid data for the corresponding specific address tag. During a RAM read cycle, the tag routes the read address through the address selector for the correct one of the RAM's. The correct RAM is read using the read address and a staged copy of the tag controls the data out selector to select data from the correct RAM for the data out bus.

During a concurrent read and write cycle, the tag selects the read addresses for one RAM and selects the write address for the other RAM. A write enable signal, is provided for the write RAM. The tag for the write address is then updated in the tag array to point to the write RAM.

With the ability to read and write concurrently to different addresses, enhanced performance results by using only a single operation to concurrently read and write to the same address in the RAM complex.

Figure 7:
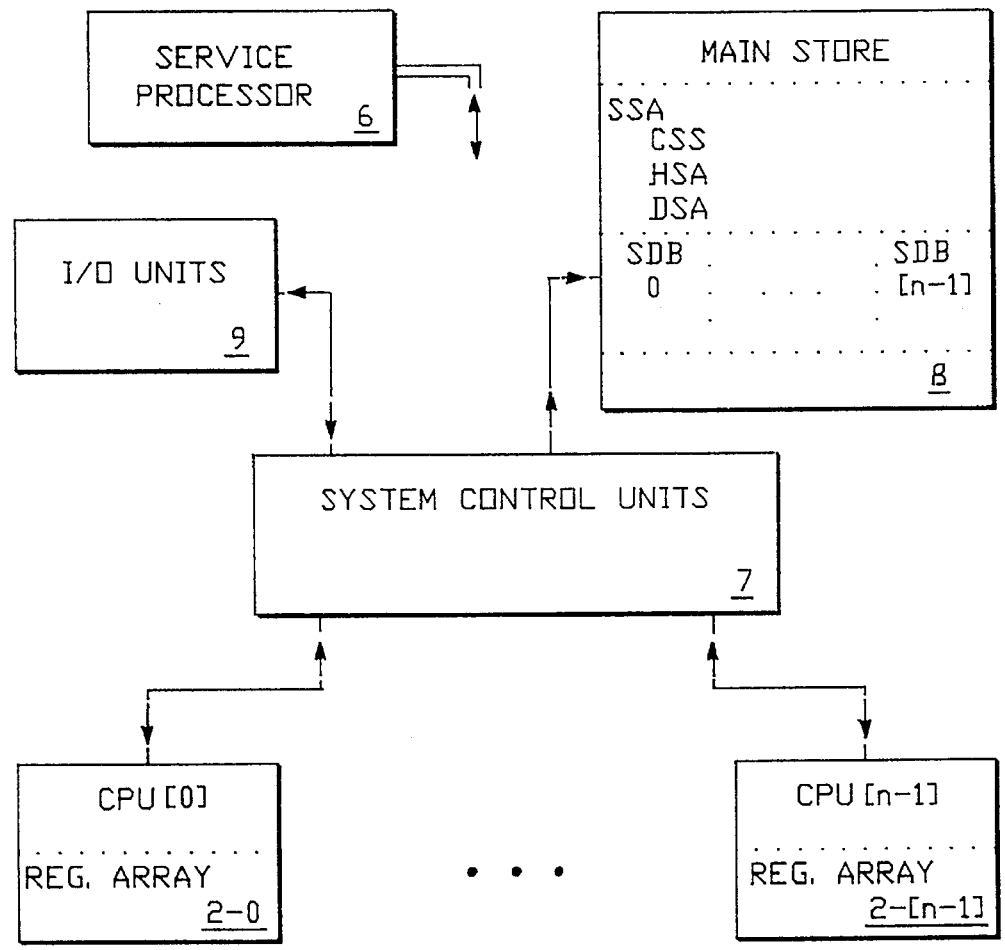
FIG. 7 depicts a block diagram of a multiple CPU system using multiple CPU's of the FIG. 1 type.

Multiple CPU System—FIG. 7

In FIG. 7, a multiple CPU embodiment of the FIG. 1 system is shown. The FIG. 7 system includes a service processor 6, I/O Unit 9, a main store 8, system control unit 7 and a plurality of CPU's including CPU(0), . . . , CPU(n−1). Each of the CPU's includes a register array including the register arrays RA(0) , . . . , RA (n−1) . The register arrays in each of the CPU's of FIG. 7 are like the register array complex 17 of FIG. 1 and of FIG. 6.

Each register array RA(0), . . . , RA(n−1) in the CPU's of FIG. 7 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or Control Interception (CI). Each RA contains architecturally-defined registers and controls, including Control State prefix, domain-native prefix, guest prefix, DAC, feature control bits, general and control registers.

The Control State PSW is store in the PSW register in the RA complex as described in connection with FIG. 6. The host PSW to be saved in the interpretive-execution mode is saved in the storage data block (SDB) of main store 8. The host GRs 14 and 15 defined to be saved in the interpretive execution mode are also saved in the SDB. The User State and Control State GRs are in the RA's.

In main storage 8, the system storage area (SSA) stores the Control State Software (CSS) [both instructions and data] and the Hardware System Area (HSA), and (2) domain storage areas (DSA), one for each domain. Mapping of these address spaces to physical main storage is via blocks of storage and a domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, CSSW can select either User PSW<AS> and PSW<T> to determine the mode of accessing main storage, or it may choose to use another set of three bits to determine the mode of accessing main storage, which can be different from the current one, as specified by the user PSW.

Figure 8:
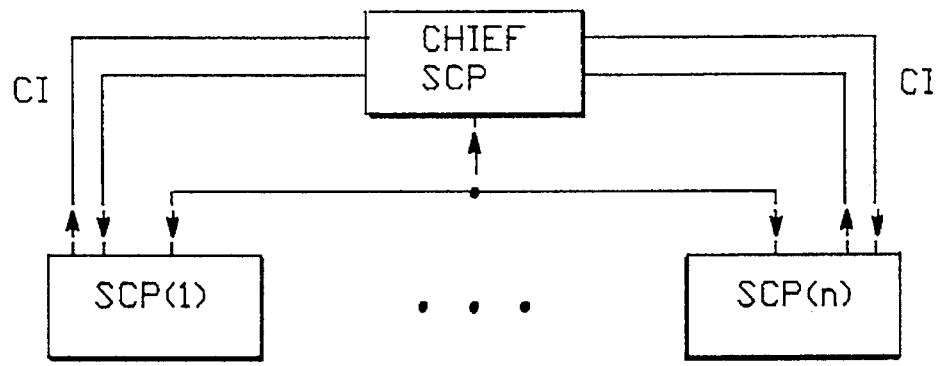
FIG. 8 depicts the relationship between a Chief SCP and standard SCP's such as MVS.
Figure 9:
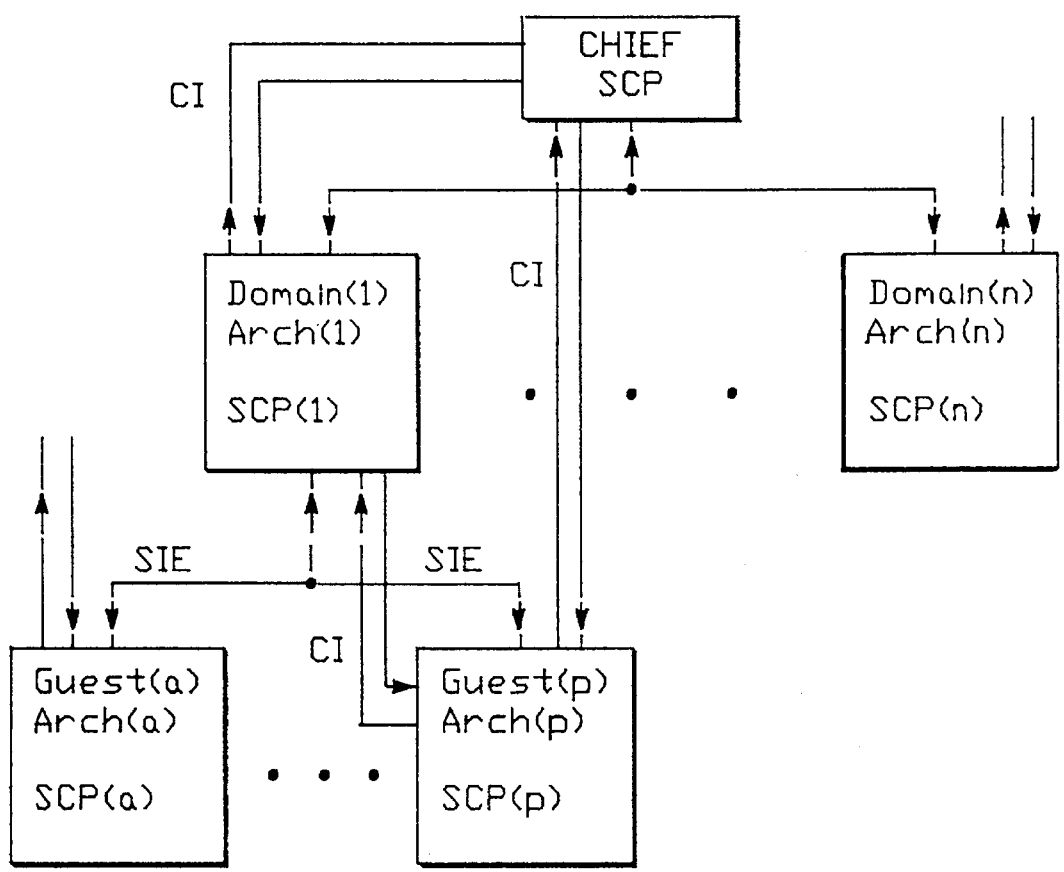
FIG. 9 depicts the relationship between the Chief SCP, first-level guests and second-level guests in the present invention.

System Control Programs (SCP's)—FIGS. 8 and 9

In FIG. 8, the relationship between a Chief SCP and a plurality of domain SCP's is indicated. The plurality of SCP's includes, for example, SCP(1), . . . , SCP(n). In normal operation, control can be transferred between the Chief and Domain SCP's by the Chief SCP with a Control Interception (CI).

In FIG. 8, all of the SCP's are first-level SCP's and one level of interception occurs between the Chief SCP and the Domain SCP's with Control Interceptions.

In FIG. 9, multiple levels of SCP's are provided. The first-level SCP's include the SCP(1), ..., SCP(n) as in FIG. 8. Each SCP in the first-level SCP's may represent a different Domain having a different architecture. Specifically, the SCP(1), ..., SCP(n) are in the domains Domain(1) , ..., Domain(n), having architectures Arch(1), ..., Arch (n).

In FIG. 9, in addition to the first-level SCP's, a plurality of second-level SCP's exist, specifically SCP(a), ..., SCP(p) which in turn are associated with Guest(a), ..., Guest(p), and each having different architectures Arch(a), ..., Arch(p), respectively. In FIG. 9, each of the second-level SCP's for the second-level Guests are associated with the first-level SCP(1). However, any of the other first-level SCP's may also spawn second-level Guests like shown for SCP(1).

In FIG. 9, any of the first-level SCP's can have a Control Interception by the Chief SCP. Similarly, any of the second-level SCP's can have a Control Interception to a first-level SCP. However, in accordance with the present invention, the second-level SCP's can also have a Control Interception directly to the Chief SCP thereby bypassing the first-level SCP running on the domain where the second-level SCP is being interpreted.

Main Storage Addressing

The main storage contains (1) a system storage area where Control State software (instructions and data) and the Hardware System Area (HSA) reside, and (2) domain storage area(s), one for each domain. Each storage area is a separate address space that is up to 2 GB in size. Mapping of these address spaces to physical main storage is via blocks of storage that are 2 MB or larger.

A domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

Advanced Address-Space Facilities

The Advanced Address-Space Facilities support domain storage access in User State and Control State and Private-Space facility, MVCDK and MVCSK, are supported.

Address Space Selections in Control State

In control state, CSSW can select either User PSW<AS> and PSW<T> to determine the mode of accessing main storage, or it may choose to use another set of three bits to determine the mode of accessing main storage, which can be different from the current one, as specified by the user PSW. This is selected using override bits in the DAC register.

STD Organization

The STD Organization is made up of the following entities:

Primary STD (PSTD), STD Array (holds 15 general STDs), Secondary STD (SSTD).

Figure 10:
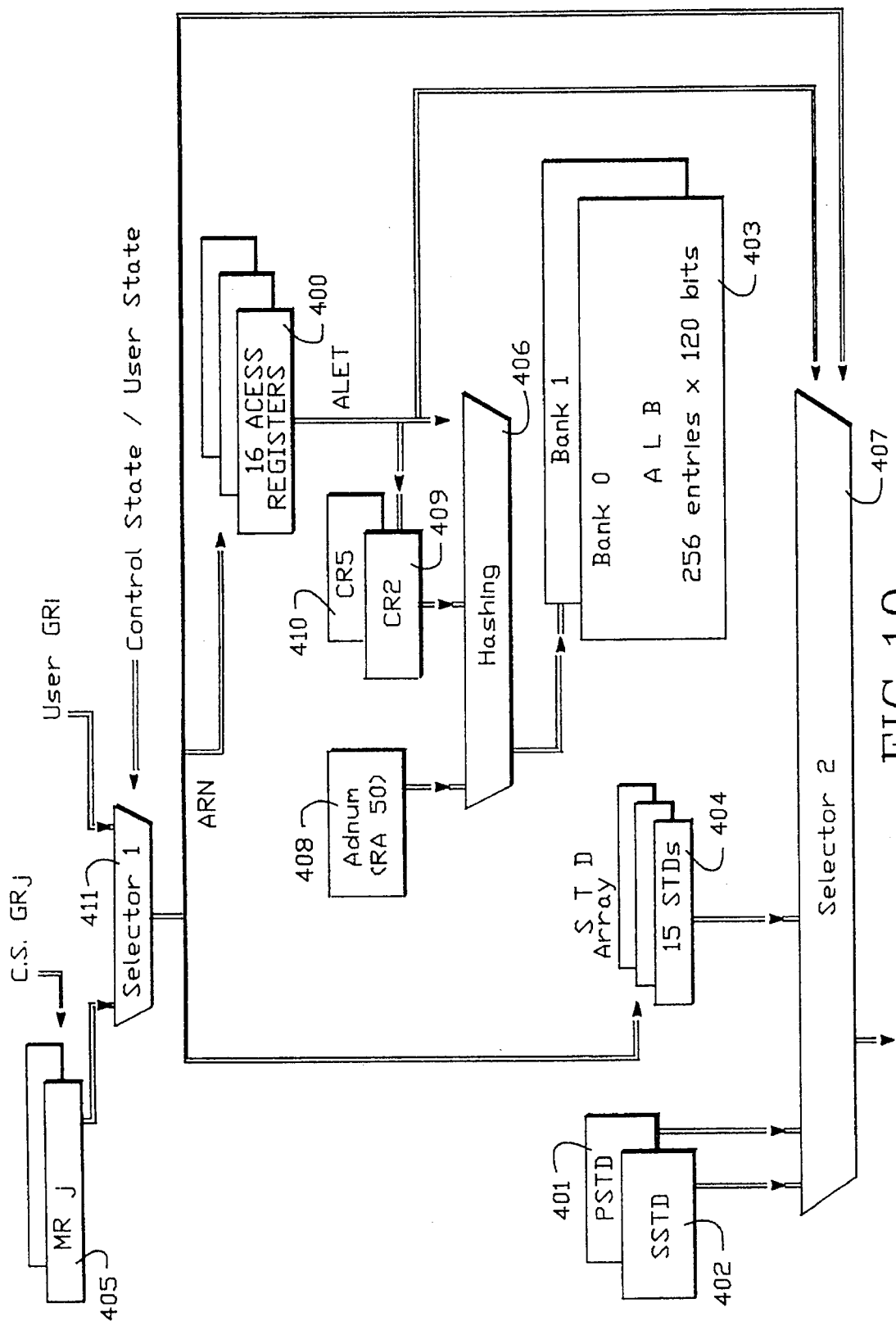
FIG. 10 depicts a block diagram of the ART unit.
Figure 11:
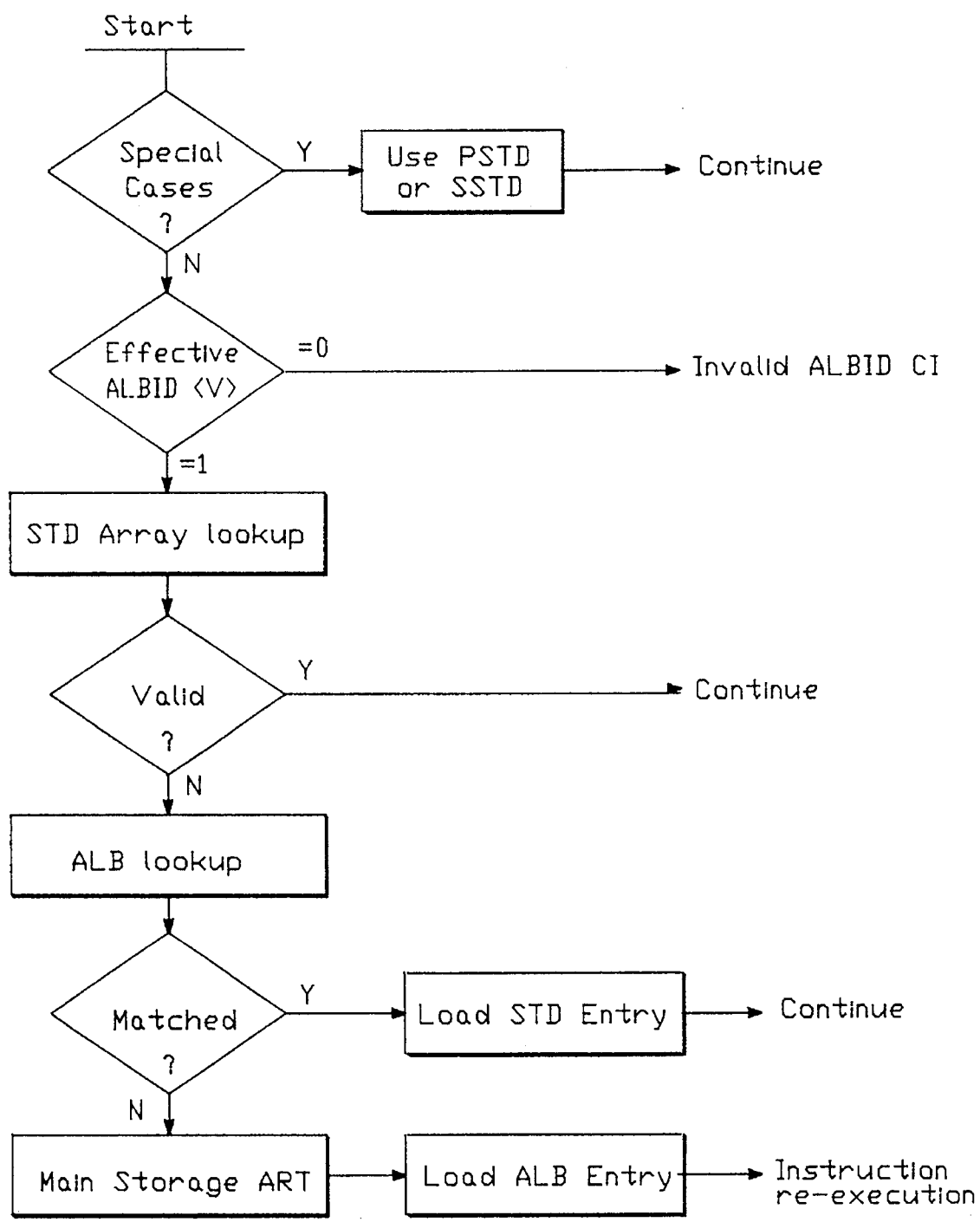
FIG. 11 depicts a flow diagram of the ART process.

ART Process and Structure FIGS. 10 and 11

The flow chart for the Access Register Translation (ART) process is shown in FIG. 11.

When a virtual storage reference is made in AR mode, the Access Register Number (ARN) indicates the access-register 400 to be used for the reference.

LI AR mode—Special Cases. ARN=0 or AR(ARN) equals 0 or 1, are considered AR mode special cases, in which PSTD 401 or SSTD 402 is selected for DAT and the ART process is completed. Else, ART proceeds to the STD Array Selection process, to determine an appropriate STD for DAT process. "STD Array Selection" is composed of the following steps.

The validity bit in the effective ALBID is tested. If this bit is found invalid (equal to zero), an Invalid ALBID program interruption CI occurs.

Else, ART proceeds to the STD Array Lookup. The ALBID is defined in Section \*(3i. .LI STD Array Lookup. An access-register (AR) has an associated entry in the STD Array, corresponding to the ARN that selects that AR. If the entry in the STD Array 404 is valid, the STD in the entry is used for the DAT process and the ART process is completed. Else, the ART proceeds to ALB lookup process. The STD Array 404 is defined in the section "STD Array structure".

This process searches the ALB 403, to find a matched entry. If a matched entry exists in the ALB 403, then the entry in the STD Array 404 is loaded with a valid STD from that ALB entry, the validity bit of that STD Array entry is set to one, the valid STD is used for the DAT process and the ART process is completed. If a matched entry is not found in the ALB 403, an ALB miss program interruption CI occurs.

As a result of the above mentioned CI, CSSW will perform main storage ART. If CSSW can complete the ART process without detecting any program exception conditions, it then updates the appropriate information in the ALB by executing a Load ALB Entry instruction. The instruction that caused the program interruption CI is then re-executed. If CSSW can not complete the ART process, the appropriate IBM defined ART program exception is emulated.

Prerequisites of the STD Array Selection Process

The computer system is in ESA/390 mode when RA(60)<M>=1.

User State:

An STD Array selection process takes place when all of the following are true:

^ ESA/390 mode

^ PSW<5,16,17>=B'101' (AR mode)

^ ARN>0 ^ AR(ARN)>1 .sp .ul

Control State:

An STD Array selection process takes place when all of the following are true:

^ ESA/390 mode

^ (DAC<25>=0 and User PSW<5,16,17>=B'101' (AR mode) or DAC<25>=1 and DAC<26:27>=B'01')

^ DAC<23:24>=B'00'

^ MR 2:7 is selected ^ ARN>0

^ AR (ARN)>1

Access Register Number (ARN)

The Access Register Number is the 4 bit field that designates an access register and an STD entry in the STD Array.

In User State, the ARN is the B field of an instruction which designates a general register containing a base address used to form the logical address of a storage operand, or the R field of an instruction which designates a general register containing the logical address of a storage operand.

In Control State, the ARN is contained in bits 28:31 of the AR Map Register.

The ARN has a value between 0 and 15. Normally, if the ARN is equal to zero, the primary STD is selected for DAT. In the special case of the TAR instruction, which makes an explicit use of an access register, ARN=0 may be used to designate AR 0.

The ARN is stored as part of certain program interruptions. The following fields related to the ARN can be stored:

1. PX-ARN—ARN field for storage access exceptions.

The ARN field for storage accesses in AR mode which detect translation program exceptions is stored as the access identification field in Domain memory location 160. Storage accesses in AR mode which result in an ALB miss cause a mandatory program interception CI with the ARN stored in the PIC <ARN> field.

2. PER-ARN—ARN field for storage alteration PER events.

The ARN field for storage alteration PER event is stored during a program exception interruption as the PER access identification field in Domain memory location 161.

The PER ARN field is not stored during a program interruption CI. Instead, the PER-ARN is assigned to the Register Array location x'5F'. Bits 28:31 contain the ARN with bits 0:27 set to zero.

AR-MAP Registers

The architecture defines 6 AR-MAP registers 405 (MRs). These registers are applicable only in Control State. When in Control State, CSSW may use Control State GRi, where 2 \(<=i \(<=7, in order to access domain storage under control of the DAC. When a Control State GRi is selected by Selector 1 411 At access domain storage, and either AR mode is in effect or the TAR instruction is executed, the i value is used to select the MR (i=2 selects first MR which is MR2). The MR.ARN field is then used to select the appropriate AR. This field may select 1 out of 16 ARs. The formats of the MRs are as follows:

AR-MAP register

```
| ERS |  r  | I | N|  r  | ARN |
0      8    15  16       28    31
```

The fields in the MR have the following meaning:

ERS—Emulation Retry Status, (MR4 (RA 34) only; reserved for all other MRs)

r—Reserved.

I—User State Interruption bit. (MR4 (RA 34) only; reserved for all other MRs) Set to one on entry to Control State via a User State Interruption CI. User State instruction CIs set the bit to zero.

N—N-bit (MR4 (RA 34) only; reserved for all other MRs). After interruption CIs, the bit indicates whether the PSW in the User State Old PSW register (RA(25)) points to the current or next sequential instruction. When set to zero indicates that the PSW in RA(25) points to the current instruction. A one indicates that the PSW points to the next sequential instruction. The bit is stored as zero for an instruction CI.

ARN—Access Register number, a 4-bit value ranging from 0 to 15. Different MRs may point to the same AR. When ARN=0, the PSTD is used.

STD for DAT Process

Selector 2 selects according to the following:

If ARN=0 or ALET=0 PSTD is selected.

If ARN>0 and ALET=1 SSTD is selected.

If ARN>0 AND alet>1 a valid STD is selected from the STD Array.

If the selected STD is not valid, a valid ALB entry is selected.

If a valid ALB entry is not found, hardware invokes CSSW via program interruption CI.

The STD Array

The purpose of the STD Array 404 is to enhance the performance of the ALB, in fetching an STD for the DAT process. The implementation of the ALB is model dependent.

Structure

The STD Array 404 is a buffer consisting of 15 entries, one entry per AR 1 through AR 15. Each entry in the STD Array has the following format:

```
| V |  STD  |
0   1      31
```

V is the valid bit. When V=1, the STD field in the STD Array entry is valid. When it is a 0, the STD field is invalid. The STD field always includes the STO, P and STL subfields, as defined by IBM. Implementation of the reserved bits is model dependent.

Creation and Use

Whenever the ART process selects an AR(ARN), except when AR 0 is selected or when the contents of the selected AR(ARN)<2, an entry from the STD Array 404 is fetched where the ARN is used to select the STD Array entry. If the V bit in this entry is 1, then the STD field from this entry is used for the DAT process. If this V bit is 0, the ALB is searched for a valid STD, and when found, this STD is used for DAT and to update and validate the missed entry in the STD Array 404. If a valid STD is not found in the ALB 403, hardware transfers control to CSSW via an ALB miss program interruption CI.

When AR 0 is selected, or when the selected AR i contains 0 or 1, PSTD 401 (CR1) or SSTD 402 (CR7) is selected for DAT, as specified by the IBM POO.

It is expected that the ART process will most frequently be completed by referring to the STD Array only. There is no entry in the STD Array 404 for ARN=0.

Selective Purge

An implicit selective purge of entry i in the STD Array 404 is done when one of the following instructions modifies AR i for i>0:

| | |
|---|---|
| Load Access Multiple | (LAM) |
| Copy Access | (CPYA) |
| Load Address Extended | (LAE) |
| Set Access | (SAR) |
| Extract Stacked Registers | (EREG) |

Selective invalidation (purge) of an STD Array entry i is done by setting the V bit of the entry to zero.

Non-Selective Purge

A non-selective purge of the entire STD Array 404 is done when one of the following operations or instructions is executed:

Hardware's responsibilities:

| | | |
|---|---|---|
| Go To Host | (GHOST) | |
| ^ Load Control | (LCTL) | - for any of CRs 2,5,8 |
| ^ Purge STD Array | (PSTDA) | _ a new instruction |
| ^ Start Interpretive Execution | (SIE) | |
| ^ CPU reset | | |

CSSW's responsibilities:

^ An implicit modification of the effective ALBID
  (Example : Domain LP dispatching)
^ Any change of Domain prefix
^ Any logical purge of the ALB
^ Any physical purge of the ALB except CPU reset
^ LP reset
^ Load Address Space Parameters (LASP) - if CR 5 or 8 are modified
  ^ Program Call          (PC)     — " —

-continued

| ^ Program Return | (PR) | — " — |
|---|---|---|
| ^ Program Transfer | (PT) | — " — |

Entries within the STD Array are not explicitly accessible by CSSW.

ART-Lookaside Buffer (ALB)

The purpose of the ALB 403 is to enhance the performance of the main storage ART process, in fetching an STD for the DAT process. The implementation of the ALB 403 is model dependent.

Structure and Creation

The ALBN is organized as a two way set associative buffer, with 256 entries of 128 bits (where 8 are ignored) in each associativity. The format of an ALB entry is as follows:

```
word
0 | V | Pv |DOM|  | r |          ALET <7:31>          |
  0   1   2   5    7                                  31
1 | r |                ALDSO <1:25>           | i
  0   1                                    26    31
2 | i |      STO           | r | P | r | STL
  0   1                    20  23  24  25   31
3 | i | r | ALBID <2:15> |         ALEAX
  0   1   2              16                          31
```

The fields in an ALB entry have the following meaning:

| # of bits | name of field | Meaning and source of information for creating a valid entry in the ALB. |
|---|---|---|
| 1 | V | ALB Validity bit. When 1, this entry is valid, otherwise it is invalid. |
| 1 | Pv | Private bit (taken from ALE) |
| 3 | DOM | Domain number (from RA (50) .ADNUM) |
| 25 | ALET<7:31> | Access List Entry Token from AR<7:31> |
| 25 | ALDSO | Access List Designation Source Origin If ALET.P=0 then taken from DUCTO (CR2<1:25>) else taken from PASTEO (CR5<1:25>) |
| 27 | STD | Segment Table Designation ( from ASTE) |
| 14 | ALBID | ALB Identification Guest/Host/Domain ID number (taken from the effective ALBID ) |
| 16 | ALEAX | Access List Entry Authorization index Taken from CR8<0:15> (CR8.EAX) * |
| 8 | r | reserved |
| 8 | i | ignored |
| 128 | | total number of bits |

In the case of the Test Access instruction, if the model implementation updates the ALB 403 on an ALB miss, the ALEAX should be taken from bits 0:15 of the general register specified by the R2 field in the instruction, rather than from CR8.

An entry in the ALB 403 is accessible by CSSW, for write purposes only, by using the instruction LOAD ALB ENTRY (LALBE). All entries of the ALB 403 are invalidated by the execution of PPALB or a physical CPU reset.

ALB Entry Address Generation

An ALB entry address is generated by a hashing mechanism 406. The following table formulates the 8 bit address:

| Hash bit | ALDSO bit | ALDSO bit | ALEN bit | ADNUM bit | ALBID bit |
|---|---|---|---|---|---|
| 0 | 19 | 25 | 24 | — | 11 |
| 1 | 18 | 24 | 25 | — | 12 |
| 2 | 15 | 23 | 26 | — | 13 |
| 3 | 14 | 22 | 27 | — | 14 |
| 4 | 13 | 21 | 28 | — | 15 |
| 5 | 12 | 20 | 29 | 0 | — |
| 6 | 11 | 17 | 30 | 1 | — |
| 7 | 10 | 16 | 31 | 2 | — |

The 'hash bits' are the address used to choose an ALB entry. Each hash bit is the modulo 2 summation of all other bits in the same row. Where:

ALDSO is CR2 CR2 409 or CR5 CR5 410 depending on whether ARi<7>=0 or 1 respectively;

ALEN is the least significant byte of the selected ARi;

ADNUM 408 is the address dimension number in RA(50;

ALBID is the effective ALBID as defined in "Introduction to the ALBID";

ARi is the Access Register participating in the ART.

Use of the ALB

The STD field in the ALB 403 is considered a valid output for DAT if the following equation is satisfied (matched):

$$(ARi<0:6>=0) * (ALB<ALET>=ARi<7:31>) *$$
$$(ALB<Pv>=0 | ALB<ALEAX>=CR8.EAX) * ((ARi<P>=0) *$$
$$(ALB<ALDSO>=CR2<1:25>) | (ARi<P>=1) *$$
$$(ALB<ALDSO>=CR5<1:25>)) * (ALB<ALBID>=RA\_ALBID<2:15>)$$
$$* (ALB<DOM>=RA(50)<ADNUM>) * (ALB<V>)=1.$$

Where:
1. The RA_ALBID is the effective ALBID. When in domain native (or host) it is DN_ALBID (RA 9A); When in guest mode it is G_ALBID (RA 9B).
2. Hardware does not check the 3rd level authorization, that is the secondary bit in the authority table entry, designated by CR8.EAX+ASTE.ATO.
3. '*' stands for a logical AND and 'l' for logical OR.
4. In the case of a Test Access instruction, the ALB<ALEAX> should be compared with the effective EAX in bits 0:15 of the general register specified by the R2 field in the instruction, rather than CR8.

If the result of this equation is not equal to 1, an ALB miss program interruption CI occurs.

This CI has a unique vector offset for each of the LRA, TPROT and TAR instructions and one common vector offset for all other instructions.

ALB Entry Replacement Algorithm (on ALB miss)

Choosing the associativity that is replaced is done in the following order of priority:

1. If an associativity is valid and matches in all fields except the ALB<ALEAX> field (and ALB<Pv>=1), that associativity is replaced.
2. If one and only one associativity is invalid—that associativity is replaced.
3. Next, if one associativity does not match domain #—that associativity is replaced.
4. Next, if one associativity does not match ALBID—that associativity is replaced.
5. Next, an associativity is selected on a random basis. .LE .P .mc | CSSW is responsible for loading the entries into the ALB.

The ALB match algorithm will cause an exigent processing damage machine check if a match is found in both associativities of the ALB. .mc | MCIC<8> will be set on. .nT P CSSW should physically purge the ALB as a result of this machine check to prevent its recurrence.

ALBID Introduction

The ALBID is a 14 bit number that identifies a guest or domain-native LP in the ALB. The purposes of this entity are to reduce the number of bits in an ALB entry and to provide a means to perform logical selective purges in the ALB. The ALBID is located in ALB entries, in RA (9A-9B)—called DN_ALBID and G_ALBID respectively, and in the LPCF—called LP_ALBID. When in domain native or host mode, the effective ALBID is DN_ALBID. When in guest mode, the effective ALBID is G_ALBID. In all places but the ALB entries, it is combined with a validity bit. In those places, it has the following format: .bx 1 5 9 24

```
| V |r|   ALBID  |
 0   1 2         15
```

V: Validity bit for the ALBID field. When V=0, ALBID is invalid, otherwise it is valid.

r: Reserved.

ALBID: A number that represents the current guest/host.

Maintenance and Assignment

CSSW is responsible for maintaining the ALBID numbers. The following are the rules for proper maintenance of the ALBID numbers:

An ALBID number is associated with an SDA for a given domain number and physical CPU in guest mode.

A new ALBID number is needed when a logical purge is performed.

A PPALB (physical purge) instruction is issued when an existing (since last PPALB) ALBID is reused.

For performance purposes, and depending on the model, CSSW may maintain a table in which ALBID numbers are associated with a domain number, a physical CPU number and an SDA. CSSW then, may use an existing valid ALBID number from this table, when it needs to provide a valid ALBID number. The effective ALBID number is updated as part of the SIE instruction or upon dispatching a new Domain.

The ALBID should be considered an extension of the SDA in Guest mode, and the two should be kept consistent, and conceptually considered as one entity. CSSW is responsible for maintaining both fields and the association between them. Modification of the LPSD.LPCF.SDA implies an update of LPSD.LPCF.LP_ALBID, but the reverse is not always true (e.g. a logical PALB). All SDA comparisons are 32 bit comparisons.

Validity

The validity bit of the effective ALBID is tested when STD Array lookup occurs or when an ALB lookup is performed, independent of the state of the validity bit of the selected STD Array entry (the validity bit of all STD Array entries are cleared on SIE entry and exit and Domain dispatching).

If the validity bit of the effective ALBID is one, the hardware ART process proceeds. If that bit is zero, control is transferred to CSSW via an Invalid ALBID program interruption CI.

ALBID Operation

1. DN_ALBID is the effective ALBID in domain native or host mode and is located in RA(9A).

The DN_ALBID is loaded by CSSW when the LP is dispatched. When the LP is dispatched for the first time, the DN_ALBID validity bit (DN_ALBID<0>) is set to zero. An STD Array Selection in domain native mode will result in an Invalid ALBID program interruption CI if that bit is equal to zero. As a result of this CI, CSSW does the following:

Assigns a new ALBID.

Loads the DN_ALBID with the new ALBID and sets DN_ALBID<V> to 1.

Updates the CSSW copy of the DN_ALBID in storage, either the copy in the LP Control Field (LPCF) or elsewhere. Note that the ALBID in the Domain Native LPCF is never accessed by the hardware.

The Invalid ALBID program interruption CI will typically occur only the first time an STD Array Selection is used in domain native mode. Thereafter, the DN_ALBID will be saved during a task switch by CSSW in both domain native and guest mode and will be reloaded in subsequent dispatches of this domain LP. The DN_ALBID is valid in guest mode and is not reloaded during a host interception, a host interruption or execution of the GHOST instruction in control state.

2. G_ALBID is the effective ALBID in guest mode and is located in RA(9B).

The G_ALBID is loaded as part of the SIE instruction and also by CSSW when an LP is dispatched in guest mode. The SIE instruction uses the following algorithm to load the G_ALBID:

If the operand address of the SIE instruction matches the SDA contained in the selected guest LPCF, then the halfword ALBID field in the LPCF is loaded into G_ALBID, including the validity bit. Note that it is possible for the ALBID<V> bit in the LPCF to be zero.

If the operand address of the SIE instruction does not match the SDA contained in the selected guest LPCF, then the G_ALBID<V> is set to zero.

STD Array Selection in guest mode will result in an Invalid ALBID program interruption CI if G_ALBID<V> is zero. As a result of this CI, CSSW does the following:

Tests a CSSW maintained ALBID cache for an entry that maps the current SDA to a valid ALBID. Note that it is model dependent whether or not such a cache is implemented. 5995M does not implement this cache.

If the cache is implemented, and a valid mapped ALBID entry is found, then the halfword ALBID is loaded into the G_ALBID, as well as the ALBID field in selected guest LPCF.

If the ALBID cache is not implemented, or a valid mapped ALBID is not found in an implemented cache, CSSW will assign a new ALBID, update the ALBID cache if implemented, load the new ALBID number together with a valid bit set to one, into the G_ALBID as well as the ALBID field in the selected guest LPCF.

The current SDA is loaded into the SDA field of the selected guest LPCF.

For preferred and fixed guests, an Invalid ALBID program interruption CI will typically occur only on the first STD Array selection. Subsequent dispatches of the same guest by SIE will set the G_ALBID to the correct value from the selected guest LPCF. In the case of pageable guests, SIE will typically dispatch guests with different SDAs. In this case, the Invalid ALBID program interruption CI will occur on the first STD Array Selection when a different pageable guest is dispatched.

The G_ALBID and DN_ALBID and the current SDA (RA(91)) will be saved during a task switch by CSSW and will be reloaded in subsequent dispatches of the LP.

Purging ALB entries

CSSW is responsible for purging the ALB. Purging can result from execution of certain instructions, such as Purge ALB and Set Prefix, or when an existing ALBID is re-used.

When the purge is to be done on behalf of a guest, the G_ALBID must be invalidated by setting the G_ALBID<V> bit to zero and also invalidating the ALBID<V> of the selected guest LPCF, as long as the SDA field of the selected guest matches the current SDA. If the ALBID cache is implemented, CSSW must invalidate the entry associated with the current SDA.

A subsequent STD Array Selection will cause an Invalid ALBID program interruption CI and CSSW will assign a new ALBID.

When the purge ALB is to be done on behalf of the host, the DN_ALBID and the domain native LPCF<LP_ALBID> (or CSSW's other save area) must be invalidated. In addition, all guest ALBIDs for the domain must be invalidated in all ESA/390 mode guest LPCFs as well as the ALBID cache if implemented. The G_ALBID validity bit is set to zero.

Assigning a new ALBID number

CSSW is responsible for assigning ALBID numbers. ALBIDs must be unique for a given domain and physical CPU. When a new ALBID is needed, CSSW will assign it. If an existing ALBID is re-used, it is necessary to perform the following:

1. Physically purge all entries from the ALB and the STD Array.

2. Find each LP in this domain that runs on this physical CPU. Note that only in certain recovery cases does CSSW expect to run more than one LP of a domain on the physical CPU.

3. For each LP found, invalidate the domain native ALBID in the LPSD, and the pageable, preferred and fixed guest ALBIDs in the LPCFs of the LPSD. If the ALBID cache is implemented, the domain-native and all guest ALBIDs for this domain must be invalidated.

Domain Addressing

The following addressing rules apply in User State and Control State:

1. A domain address is a guest or domain-native address depending on the current mode of the LP: guest address if Domain Mode Control <A>=1 (except when explicitly specified as host storage references by the IBM IEF specification or the compatibility specification, or overridden in Control State and domain-native address if Domain Mode Control <A>=0.

2. A logical address is virtual or real depending on the user (again, a guest or domain-native PSW is used depending on the current mode of the LP) PSW<T>: virtual if 1, and real if 0 (except when explicitly specified in the instruction definition as virtual, as in IVSK, or overridden in Control State).

3. Domain addressing references storage of the current domain.

4. If an effective address is a domain virtual address, AR applies during the DAT process if an AR is selected.

5. A host storage access in guest mode has the following characteristics:

31-bit (HPSW<A>=1).

No PER (HPSW<R>=0).

Key protection does not apply (HPSW<KEY>=0). (Note that fetch protection override is irrelevant. For convenience, the effective HCR0<6> may be treated as 1.)

No low address protection (HCR0<3>=0).

A host virtual storage access (this implies that the effective HPSW<T,C>=b'11') in guest mode has the following additional characteristics:

Primary (HPSW<AS>=b'00').

Translation format HCR0<8:12>=b'10110'.

The domain-native CR1 contains the current host primary STD.

LRA instruction translates the second operand as a host virtual address to a host real address. .LE .P Note that the HPSW and HCRs mentioned in the above discussion are the "effective" host PSW and CRs values used for the control of the host storage access; these values may differ from the actual values in the corresponding domain-native PSW and CRs. .LE.*

Domain Addressing In Control State

In the computer system, CPU generated addresses in Control State are system addresses unless (i) the operand address of a specific instruction is explicitly defined to be a domain address in this document (currently none defined), or (ii) implicit domain addressing (IDA) is used. "implicit domain addressing (IDA)" "domain addressing, implicit" "IDA (implicit domain addressing)" Control State GRs 2:7 are referred to as .ul Domain Addressing Base Registers (DABRs) in any of the following situations: "DABR (domain addressing base register)" "domain addressing base register, (DABR)" .AL .LI If they are used as a base register. .LI For RR or RRE format instructions, if they are used as an operand register specifying an address that accesses storage. .LI For QST, VS, or VST format instructions, if they are specified in the RS2 field (containing a storage-operand address). .LE .P (Note that although the DABRs are called "base" registers for historical reasons, they include GRs that are not used as base registers as in RR or RRE format instructions.) Under the control of the .ul Domain Access Controls (DAC) register, an effective address generated using a DABR can be a domain address of the current domain. This process of addressing domain storage in Control State is referred to as implicit domain addressing. .DS .fi The following figure identifies register fields, by instruction format, that can designate a DABR: .nf .sp

| Instruction Format | | | | | | | | | | | | | | | | | DABRs\(dg.bx |
|---|---|---|---|---|---|---|---|---|---|---|---|---|---|---|---|---|---|
| | 6 | | 14 | | | | 20 | | 24 | | | | | 36 | | | |
| AS | | Opc | | RA1 | | | | B2 | | | D2 | | | | B2 .bx end | | .sp −1.bx |
| | 6 | | | | | | 20 | | | | | | | | | | |
| E | | Opc | | | | | | | | | | | | | | | − .bc |
| | 6 | | | | | | 20 | | 24 | | 28 | | 32 | 36 | | | |
| QST | | Opc | | | | | | QR3 | | RT2 | | VR1 | | RS2 | | RS2 .bx end | .sp −1.bx |
| | 6 | | 14 | | 17 | | 20 | | | | | | | | | | |
| RR | | Opc | | R1 | | R2 | | | | | | | | | | | R1,R2 .bc |
| | 6 | | | | | | 20 | | | | 28 | | 32 | 36 | | | |
| RRE | | Opc | | | | | | /////// | | | | R1 | | R2 | | | R1,R2 .bc |
| | 6 | | 14 | | 17 | | 20 | | 24 | | | | | 36 | | | |
| RS | | Opc | | R1 | | R3 | | B2 | | | D2 | | | | | | B2 .bx |
| RX | | Opc | | R1 | | X2 | | B2 | | | D2 | | | | | | B2 .bc |
| | 6 | | | | | | 20 | | 24 | | 28 | | 32 | 36 | 40 | | |
| RSE | | Opc | | | | | | R3 | | /// | | VR1 | | /// | B2 | D2 | |
| | | | | | | | | | | | | | | | B2 .bx end | .sp −1 .bx |
| | 6 | | | | | | 20 | | 24 | | | | | 36 | | | |
| S | | Opc | | | | | | B2 | | | D2 | | | | | B2 .bc | |
| | 6 | | 14 | | | | 20 | | 24 | | | | | 36 | | | |
| SI | | Opc | | I2 | | | | B1 | | | D1 | | | | | | B1 .bc |
| | 6 | | 14 | | | | 20 | | 24 | | | | | 36 | 40 | | 52 |
| SS | | Opc | | ** | | | | B1 | | | D1 | | | | B2 | D2 | |
| | | | | | | | | | | | | | | | | | B1,B2 .bc |
| | 6 | | | | | | 20 | | 24 | | | | | 36 | 40 | | 52 |
| SSE | | Opc | | | | | | B1 | | | D1 | | | | B2 | D2 | |
| | | | | | | | | | | | | | | | B1,B2 .bx end | .sp −1 .bx |
| | 6 | | | | | | 20 | | | | | | 32 | 36 | | | |
| VS | | Opc | | | | | | ///////// | | | | | RS2 | | | | RS2 .bc |
| | 6 | | | | | | 20 | | 24 | | 28 | | 32 | 36 | | | |
| VST | | Opc | | | | | | VR3 | | RT2 | | VR1 | | RS2 | | | RS2 .bx | off .VL 4 .LI \(dg—The listed field designates a DABR if it designates one of Control State GRs 2:7, which contains an address that is used to access processor storage. .LE .P .FG "DABRs" .DE .*

Domain-Access-Specification Program Exception

The "current domain" during a domain storage access is designated by the ADNUM field in the Domain CPU Data register in the RA. If a domain storage access is made in Control State with the ADNUM field equal to zero, a domain-access-specification program exception is recognized and a mandatory program interruption CI results. .sp The machine unit of operation (MUO) is suppressed. .sp The ILC is 1, 2, or 3 and indicates the length of the instruction causing the exception. .sp The domain-access-specification exception is indicated by a program-interruption code of X'0073'. .sp .*

DAC—Format And Operation SH 3f

The Domain Access Controls (DAC) register is a 4-byte register in the register array. Thus, it can be loaded and stored in Control State by the RA-manipulation instructions. Its controls are effective only in Control State. It provides overrides for certain fields of the User PSW, feature control, and/or User control registers, which would otherwise control CPU domain addressing. The DAC register has the following format:

```
.DS .bx "1 25 34 36 38 40 42" "46 48 50 52 54"
|    r    |DABR Ctl |r |H|T|V|AS |R|A|L|K| .bx end
 0       1 1              2 2 2 2   2 2 3 3
       5 6 1 2  3 4 5  6 7 8 9 0 1 .DE  .ul
```

Domain Addressing Base Register Control, DABR ctl

This field provides the capability to address domain storage in Control State. Unlike/ARs, the domain addressing capability using DABRs and DABR Ctl applies to real addresses in addition to virtual addresses. Each bit in the DABR Ctl field independently controls a DABR. DABR Ctl <i> controls Control State GR i+2, 0 \z<_i \z<_5. If a DABR Ctl bit is 0 the corresponding DABR is disabled. If a DABR Ctl bit is 1 the corresponding DABR is enabled. The address type is determined as follows: .AL 1 .LI When a DABR is disabled, the Control State GR operates identically to a non-DABR Control State GR. That is, effective addresses generated using the disabled DABR are system addresses. .br .LI When a DABR is enabled, effective addresses generated using the enabled DABR are domain addresses of the current domain. (An .I "effective address", "effective address" "address, effective" is either an address contained in a register designated by an R or RS field in an instruction or is calculated from the sum of three binary numbers: base address, index, and displacement.) This rule applies to all Control State instructions except when the operand address is one of the following: .AL a .LI An instruction address, including branch addresses, and the targets of EXECUTE and PFI. An operand address that specifies an instruction to be fetched in Control State is a system address. RUS operand access is made in User State; thus, the operand address of RUS is always a domain address whether or not a DABR is used. .mc | .P .mc .LI An operand that is specified to be an offset to a base address. In this case, the base address determines the type of addressing. Offsets to which DABRs do not apply are: second operand of IPTE. .br .LI An operand address that is not used to access storage or DAT translated. More precisely, these are operand addresses that can .I "never" cause an access exception. In this case, address type is irrelevant, and the size of the address generated in Control State is always 31-bit. Such addresses to which DABRs do not apply are: 1st-operand address of MC, LMRA, LMRAS, STMRA, and 2nd-operand address of CFC*, LA, shift instructions (SLDA, SLDL, SLA, SLL, SRDA, SRDL, SRA, SRL, SRP), LASP*, PC*, SAC, SPKA, SIGP, TPROT, S/370 I/O instructions (CONCS*, DISCS*, CLRCH*, CLRIO*, HDV*, HIO*, RIO*, SIO*, SIOF*, STIDC*, TCH*, TIO*), ADSP, AGSP, ITLBE, LRR, STRR, DNOP, DSTOP, RLINI, RLINO, RSVP, SMEHL, WHMD, and SIGSYS. .br .FS * .I "5995M:" Those instructions followed by an '*' are invalid in Control State, and therefore DABRs do not apply. They are listed here for completeness. .br .FE .br .LI Operand address of any Control State instruction whose operand address is explicitly specified to be a system address. .LI An implicit operand address. e.g. addresses in GRs1:3 of CFC, and GR5 of UPT*. .LE .LE .nT I DABRs apply to all RS operands of QST, VS, VST format instructions and the following RR or RRE instruction operands: MVCL (R1, R2), CLCL (R1, R2), IPTE (R1), IVSK (R2), ISK,(R2), ISKE (R2), ISKEC (R2), SSK*(R2), SSKE (R2), SSKEC (R2), RRBE (R2), RRBEC (R2), TB*(R2), PGIN (R1, R2), RRB (R2), PGOUT (R1, R2), RMIP*(R2), RMIS*(R2), LURA (R2), STURA (R2). .nT end .sp Other defined bits in the DAC registers, namely the V, H, T, AS, R, A, L, and K bits, apply to all domain addresses in Control State (rather than just the ones associated with a specific DABR) if they are ones. The bit has no effect (does not override) if it is zero. The bits affect addressing as follows H\=Host Addressing Override: This bit is ignored if Domain Mode Control <A>=0. When Domain Mode Control <A>=1 and the H bit is 1, a domain effective address is treated as a host primary virtual address, unless the T-bit=1, in which case it is treated as a host real address (ie: PSW<T> is ignored). Note that the H override bit applies only to storage accesses and does not apply to the type of (host versus guest) registers being accessed. Also, direct references to storage keys (via key-manipulating instructions) is not affected by the H bit. The only exception to this is that the operation of PTLB is affected by the state of the H override bit. When T=1, it suppresses translation on domain logical addresses (overrides User PSW<T>, which is treated as 0) and the effective address is a real address. This bit does not apply to addresses which are always virtual. When V=0, translation is determined by user PSW<T> and Address Space mode is determined by user PSW <AS>. When V=1, user PSW<T> is ignored and Address Space mode is determined by DAC <AS>. In System/370 mode, only primary and secondary address space mode apply and DAC<27> is ignored. This bit is ignored (effectively zero) for addresses that are explicitly designated, when DAC<T>=1, or if DAC<H>=1 and Domain Mode Control<A>=1. Address Space mode for domain storage access when V=1. The meaning of this field is the same as for PSW <AS>. When V=0, this field is ignored. In System/370 mode, AS=B'0x' specifies primary mode and AS=B'1x' specifies secondary mode. Suppress PER storage-alteration-event tests on domain main storage accesses (overrides User CR9 <2>, which is treated as 0. Use 31-bit effective addressing generation rules for domain addresses. (Overrides User PSW <A>, which is treated as 1). This control takes effect irrespective of (1) whether the User PSW specifies BC mode or EC mode, and (2) whether the domain CPU (domain-native or guest) operates in ESA/390 mode or System/370 mode. However, if the domain address is a S/370 virtual address and DAC<A>=1, the results of dynamic address translation are unpredictable. Suppress low-address protection on domain main storage accesses (overrides User CR0 <3>, which is treated as 0). Suppress key protection on domain main storage accesses overrides only the User PSW<KEY>. It does not override the key specified by an instruction (e.g. MVCK, MVCSK, MVCDK or TPROT).) ignored for purposes of control (but capable of being set/stored) to zero when initialized set as specified stored as last set. The contents of the DAC register have no effect in User State.

Initialization Of The DAC Register

Upon each Control Interception, the DAC register is initialized according to information in the Vector Table Entry. The DAC register is cleared to zero with valid checking-block code upon an initial CPU reset. Upon a CPU reset, the DAC register remains unchanged. Depending on the model, the checking-block code may be made valid. If not made valid, the contents can be validated by the program using model-dependent means DAC is not affected by subsystem resets.

Hardware System Area

Machine information such as microcode and control blocks, including the HSA Directory, is maintained in locations within system storage that are generally referred to as Hardware System Area (HSA). Thus, the information can be accessed by Control State Software using system addresses. No protection other than key-controlled protection is provided for the HSA. The machine information is organized in units of information blocks. The starting addresses of these information blocks (excluding the HSA Directory itself) are provided in the HSA Directory. Each information block occupies contiguous system absolute locations. However, the HSA as a whole is not necessarily contiguous.

HSA Directory Base Address

The HSA Directory starts on a cache line boundary. The exact location of the HSA Directory is installation dependent. However, its starting address (a system absolute address) is referred to as the HSA Directory Base Address and is provided for inspection by Control State Software in the Register Array (RA). Modifying the RA copy of the base address affects the local CPU but has no effect on the location of the HSA Directory assumed by other CPUs or the channel subsystem. The HSA Directory base address in the RA is loaded as part of CPU initialization. Control State software may store it to inspect its value but must not modify it; otherwise, operations referencing the HSA will become unpredictable.

HSA Directory

The first doubleword of the HSA Directory provides information about the HSA Directory itself. In particular, byte 4 contains the BID X'40' for recovery use, and bytes 6:7 contain the size of the HSA Directory in bytes. Starting with the second doubleword, each entry in the HSA Directory provides addressing information about a corresponding information block in the HSA. Each entry is 8 bytes long, and has the following fields:

```
    0        4           7
(byte)| address| length (bytes)|
```

The address field contains the 31-bit absolute address of the starting byte location of the information block. (If bit 0=1 then the address is invalid.) There is no requirement for this address starting on any boundary other than a byte boundary. However, some items may have their own requirements for boundary conditions. Since operand addresses in Control State are normally system real addresses (i.e. Control State prefixing applies), in order that one may use an address from the HSA directory directly, the HSA should not contain absolute page zero, and none of the Control State prefixes should point to a page within HSA. The first restriction is observed by the SVP during HSA initialization. The second restriction is observed by CSSW when setting Control State prefixes. The length field indicates the total number of bytes that are allocated to the associated item. Reserved entries contain the Initial Null Pointer in the first word and a length of zero in the second word. Defined entries for which corresponding information blocks are not allocated during HSA initialization also contain the Initial Null Pointer and zero length value until the information blocks are allocated.

Dynamic Address Translation

Dynamic address translation is provided for domain (guest and domain-native) addressing. Dynamic address translation is not provided for system addressing. (CSPSW <5> does not control DAT.) If IPTE or LRA is executed in Control State and implicit domain addressing is not used, the result is unpredictable. The following 2 tables summarize the address types that can be assumed by an operand effective address.

Primary address space mode SEC—Secondary address space mode HOM—Home address space mode STDi Is in accordance with the selected ARi where 1 \(<=i \(<=15. STDj—Designated by the contents of the selected MRn where 2 \(<=n \(<=7 and 1 \(<=MRn \(<=15. When i=0, or MRn=0 or when ARi=0, the PRI STD is used. When i\(!=0 and MRn\(!=0 and ARi=1, the SEC STD is used. These 0, 1, >1 values relate to the content of the appropriate ARi, as selected by the appropriate GRi field in the instruction. In all other cases in that column, they relate to the content of ARi, as selected by the appropriate MRn.

Access Register Translation (ART)

Access Register Translation (ART) is defined in the IBM ESA/390 architecture. In the present embodiment, ART is effective only for Domain addressing; it is not applicable to Control State addressing.

Both the Domain Native and Guest ALBID validity bits in the Register Array (RA) are initialized to zero, indicating that these values have not yet been established by CSSW. The ALBID validity bits of all LPCF's are also initialized to zero.

When a Domain Native LP is dispatched (started) under a give Domain, the ART is invoked while in User State, the hardware will test the validity bit of the selected ALBID in the RA (Domain Native). Upon detection of an invalid ALBID, a Control Intercept (CI) is generated to transfer control of the processor to CSSW.

CSSI generates an ALBID unique to the physical CPU number, the Domain number, and the State Descriptor Address of the LP and stores it in the ALBID field of the associated LPCF. CSSW updates the list of all ALBID's associated with the given Domain, which can have any number of LP's associated with (running under) it. The Domain Native ALBID in the RA is updated with this value, and the associated validity bit is set. Control is transferred back to the Lp in User State and operation of the instruction causing the CI is restarted.

When the instruction is retried, the newly-set ALBID validity bit in the RAallows the ART process to complete, resulting in the creation of a new entry in the ALB with its ALBID field set to the same value as the current Domain Native ALBID. For subsequent invocations of the ART process, this field will be compared to the currently selected (Domain Native or Host) ALBID in the RA. If this field matches the value in the selected RA, and all other match control fields in the entry match their architected check values, the entry will be considered valid for use in ART; if this field does not match, the entry will be considered invalid.

When a guest LP is dispatched by the Start Interpretive Execution (SIE) instruction, a unique ALBID must be established for the Guest LP in order to avoid erroneous matches against entries in the ALB already created for the dispatching Host. A Host can dispatch multiple Guests, each of which is uniquely identified by the SDA used to dispatch it. As part of the operation of the SIE instruction, the generated SDA is compared to one saved in the LPCF for the LP. If it matches, indicating that the SIE instruction is dispatching a previously established Guest, the ALBID and validity bit are loaded from the LPCF into the Guest ALBID and associated validity bit in the RA. When ART is subsequently invoked by the Guest, the (set) validity bit of the Guest ALBID will allow the ART process to proceed normally, and the ALBID field(s) of selected entries in the ALB will be matched against the Guest ALBID. Any entries previously created by this Guest will have ALBID fields which match the Guest ALBID, and if all other match control fields in the entry match their architected check values, the entry will be considered valid for use in ART. If this field does not match, the entry will be considered invalid.

On the first dispatch of the Guest, ALBID validity bit will be equal to zero: A CI is generated to transfer control to CSSW, where a unique ALBID is generated, stored in the LPCF and Guest ALBID in the RA, the list of valid ALBID's maintained for the Domain and physical CPU is updated, and the associated validity bit is set. Control is transferred back to the Host in User State to allow completion of the SIE instruction. When the Guest invokes ART, the validity bit will be tested, and when found to be valid, ART will proceed resulting in the creation of entries in the ALB with ALBID fields equal to the Guest ALBID. On subsequent dispatches of this Guest, these entries will be considered valid for use by ART.

Whenever a context switch is made back to the Host, the Domain Native (Host) ALBID in the Ra will be selected and all entries made in the ALB for the Host will remain valid unless replaced. The SDA checking mechanism will be invoked by the SIE instruction whenever new or old Guests are dispatched by the Host and all ALB entries created for old Guests will be preserved unless replaced while new entries will be created for new Guests.

Whenever a Guest executes a PALB instruction, a CI is generated to transfer control to CSSW and a new ALBID is generated for the Guest. The LPCF is updated with the new value, the Guest ALBID in the RA is updated, and the associated validity bit is set. Control is transferred back to the Guest with the updated ALBID, which by definition cannot match any existing entries in the ALF, effectively producing a logical purge of the ALB as seen by the Guest.

Whenever a Host executes a PALB instruction, a CI is generated to transfer control to CSSW as well. In this case, the LPCF for the Host must be updated with the new ALBID and its validity bit set, while the LPCF of each Guest dispatched by the Host must have the ALBID validity bit reset. Since CSSW maintains all CPCF's for LP's executing on this physical CPU, all LPCF's can be updated as needed. Control is transferred back to the Host in User State where the updated (Host) ALBID by definition cannot match any existing entries in the ALB, effectively producing a logical purge of the ALB as seen by the Host. Whenever the Host subsequently dispatches new or old Guests, the SDA match function will be performed as part of the SIE instruction and old Guests will be dispatched with the Guest ALBID validity bit reset, causing a CI to CSSW when ART is invoked by the Guest, and the establishment of a new ALBID for the Guest, after which normal User State operation is resumed. New Guests will have an SDA which does not match the one in the LPCF, and so will generate a CI to CSSW during the SIE operation to cause the establishment of a new ALBID for the Guest, after which SIE operation is completed and normal operation of the Guest is resumed.

The number of unique ALBID's that can be generated for a physical CPU (or physical ALB) is limited by the number of bits (n) in the ALBID. Eventually, CSSW will exhaust the unique ALBID's available to it and will have to reuse values previously associated with specific LP's. In order to avoid aliasing between ALB entries created by these LP's and those created by new LP's, whenever the ALBID space is exhausted by CSSW, a Physical Purge ALB (PPALB) instruction is issued which invalidates all entries in the physical ALB implemented for a physical CPU regardless of the values of their ALBID fields. No LP can match any entry in the ALB after this operation and CSSW can assign new ALBID's to LP's running on the CPU as needed.

Advantages

This mechanism takes advantage of Control State Software to effectively manage the ALB resource on a physical CPU. The mechanism allows the physical ALB to maintain logical integrity as seen by (z) Logical Processors (LP's) that may be running on the physical CPU. ALB entries created by a given LP are uniquely identified with that LP, and are preserved across context switches; thereby avoiding the performance degradation normally associated with the context switch.

The need for the implementation of a hardware search mechanism to identify ALB entries associated with a given LP and invalidate them whenever the LP performs a PALB function is obviated by the use of a Control Intercept and ALBID assignment algorithm which effectively performs logical purge of the ALB as seen by the LP without having to search the physical ALB at all.

As the physical size of the ALB increases (on future designs, for example), the relative performance advantage of the ALBID-based purge mechanism versus a hardware search machine-based mechanism increases since no additional processor cycles are required to perform the purge as the size of the ALB increases with the former mechanism, while the number of cycles required is directly proportional to the size of the ALB with the latter mechanism.

Effective management of ALB entries is provided for both Host and Guest mode, as defined in the IBM architecture. The capability is provided to manage entries for multiple Guests dispatched by a given Host.

We claim:

1. An access control apparatus in a computer system, said computer system including storage, physical processors, logical processors (LP's) which can operate in either a host or guest mode, access registers, an access-register translator (ART), an ART-lookaside buffer (ALB) for storing entries created by said logical processors, said access control apparatus comprising:

a host ALBID register for storing an ALB identifier (ALBID) and an ALBID validity indicator for the host mode of the logical processor;

a guest ALBID register for storing an ALB identifier (ALBID) and an ALBID validity indicator for the most recent guest mode on the logical processor;

first means for generating and storing in said host ALBID register an ALB identifier (ALBID) and for marking valid said ALBID validity indicator in said host ALBID register when a host mode is initiated on said logical processor and when a logical purge is requested during the host mode by said logical processor;

second means for generating and storing in said guest ALBID register an ALB identifier (ALBID) and for marking valid said ALBID validity indicator in said guest ALBID register when a guest mode is first initiated on said logical processor and when a logical purge is requested during a guest mode by said logical processor;

third means for storing in each ALB entry the host ALBID in said host ALBID register when an ALB entry is made in said ALB by said logical processor when said logical processor is in said host mode;

fourth means for storing in each ALB entry the guest ALBID in said guest ALBID register when an ALB entry is made in said ALB by said logical processor when said logical processor is in said guest mode;

fifth means for permitting access by the logical processor while in the host mode to an ALB entry in said ALB when said ALBID in said ALB entry matches the ALBID stored in said host ALBID register and the valid indicator in said ALBID host register is marked valid; and sixth means for permitting access by the logical processor while in the guest mode to an ALB entry in said ALB when said ALBID in said ALB entry matches the ALBID stored in said guest ALBID register and the valid indicator in said ALBID guest register is mark valid.

2. The access control apparatus of claim 1 wherein each said ALBID generated by said first and second means that uniquely associates a domain number, a logical storage address, and a State Descriptor Address when a logical processor is running in the guest mode.

3. The access control apparatus of claim 1 wherein said fifth means includes:

seventh means for checking the validity indicator in the host ALBID register when access to said ALB is requested by a logical processor in said host mode and for initiating a Control Intercept to Control State Software (CSSW) when the validity indicator is marked invalid; and wherein said sixth means includes:

eighth means for checking the validity indicator in the guest ALBID register when access to said ALB is requested by a logical processor in said guest mode and for initiating a Control Intercept to Control State Software (CSSW) when the validity indicator is marked invalid.

4. The access control apparatus of claim 3 wherein:

said first means resides in said CSSW stored in said storage and in response to said Control Interrupt and said logical processor being in said host mode generates and stores said host ALBID in said host ALBID register, marks valid said validity indicator in said host ALBID register and then returns control back to the logical processor for retrying the request for access to the ALB; and said second means resides in said CSSW stored in said storage and in response to said Control Interrupt and said logical processor being in said guest mode generates and stores said guest ALBID in said guest ALBID register, marks valid said validity indicator in said guest ALBID register and then returns control back to the logical processor for retrying the request for access to the ALB.

5. The access control apparatus of claim 3 wherein:

said first means in response to a request for a logical purge marks as invalid said validity indicator in said host ALBID register and said guest ALBID register which effects a logical purge by causing a new ALBID to be generated for the host mode of the logical processor.

6. The access control apparatus of claim 3 wherein:

said second means in response to a request for a logical purge while the logical processor is in said guest mode marks as invalid said validity indicator in said guest ALBID register which effects a logical purge by causing a new ALBID to be generated for said guest mode of the logical processor.

7. The access control apparatus of claim 3 wherein:

said third and fourth means reside in said CSSW stored in said storage.

8. An access control apparatus in a computer system, said computer system including storage, physical processors, logical processors (LP's) which can operate in either a host or guest mode, access registers, an access-register translator (ART), an ART-lookaside buffer (ALB) for storing entries created by said logical processors, said access control apparatus comprising:

a host ALBID register for storing an ALB identifier (ALBID) and an ALBID validity indicator for the host mode of the logical processor;

a guest ALBID register for storing an ALB identifier (ALBID) and an ALBID validity indicator for the most recent guest mode on the logical processor;

Control State Software (CSSW) stored in said storage performing the functions of:

generating and storing in said host ALBID register an unique ALB identifier (ALBID) and for marking valid said ALBID validity indicator in said host ALBID register when a host mode is initiated on said logical processor and when a logical purge is requested during the host mode by said logical processor;

generating and storing in said guest ALBID register an unique ALB identifier (ALBID) and for marking valid said ALBID validity indicator in said guest ALBID register when a guest mode is first initiated on said logical processor and when a logical purge is requested during a guest mode by said logical processor;

storing in each ALB entry the host ALBID in said host ALBID register when an ALB entry is made in said ALB by said logical processor when said logical processor is in said host mode; and storing in each ALB entry the guest ALBID in said guest ALBID register when an ALB entry is made in said ALB by said logical processor when said logical processor is in said guest mode;

first means for permitting access by the logical processor while in said host mode to an ALB entry in said ALB when said ALBID in said ALB entry matches the ALBID stored in said host ALBID register and the valid indicator in said ALBID host register is marked valid; and second means for permitting access by the logical processor while in the guest mode to an ALB entry in said ALB when said ALBID in said ALB entry matches the ALBID stored in said guest ALBID register and the valid indicator in said ALBID guest register is marked valid.

9. The access control apparatus of claim 8 wherein each said ALBID generated by said CSSW uniquely associates a domain number, a logical storage address, and a State Descriptor Address when a logical processor is running in the guest mode.

10. The access control apparatus of claim 8 wherein said first means includes:

third means for checking the validity indicator in the host ALBID register when access to said ALB is requested by a logical processor in said host mode and for initiating a Control Intercept to said Control State Software (CSSW) when the validity indicator is marked invalid; and wherein said second means includes:

fourth means for checking the validity indicator in the guest ALBID register when access to said ALB is requested by a logical processor in said guest mode and for initiating a Control Intercept to said Control State Software (CSSW) when the validity indicator is marked invalid.

11. The access control apparatus of claim 10 wherein:

said CSSW in response to said Control Interrupt and said logical processor being in said host mode performs the functions of generating and storing said host ALBID in said host ALBID register, marking valid said validity indicator in said host ALBID register and then returning control back to said logical processor for retrying the request for access to the ALB; and said CSSW in response to said Control Interrupt and said logical processor being in said guest mode performs the functions of generating and storing said guest ALBID in said guest ALBID register, marking valid said validity indicator in said guest ALBID register and then returning control back to the logical processor for retrying the request for access to the ALB.

12. The access control apparatus of claim 8 wherein said CSSW performs a logical purge in response to a logical purge request during a host mode of operation of a logical processor by performing the function of:

marking invalid said validity indicator in said host ALBID register;

generating a new host ALBID;

storing said new host ALBID in said host ALBID register; and marking valid said validity indicator in said host ALBID register.

13. The access control apparatus of claim 8 wherein said CSSW performs a logical purge in response to a logical purge request during a host mode of operation of a logical processor by performing the function of:

marking invalid said validity indicator in said guest ALBID register;

generating a new guest ALBID;

storing said new guest ALBID in said host ALBID register: and marking valid said validity indicator in said guest ALBID register.

* * * * *